United States Patent [19]

Tanaka

[11] Patent Number: 5,580,679
[45] Date of Patent: Dec. 3, 1996

[54] NONAQUEOUS BATTERY

[75] Inventor: Mitsutoshi Tanaka, Kanagawa, Japan

[73] Assignee: Fuji Photo Film Co., Ltd., Kanagawa, Japan

[21] Appl. No.: 447,053

[22] Filed: May 22, 1995

Related U.S. Application Data

[63] Continuation of Ser. No. 274,026, Jul. 12, 1994, abandoned.

[30] Foreign Application Priority Data

Jul. 12, 1993 [JP] Japan .................................. 5-171581

[51] Int. Cl.$^6$ ...................................................... H01M 2/08
[52] U.S. Cl. ........................... 429/185; 429/171; 429/173
[58] Field of Search ............................. 429/185, 171, 429/173; 523/134

[56] References Cited

U.S. PATENT DOCUMENTS

| | | | |
|---|---|---|---|
| 3,214,300 | 10/1965 | Nordvik | 429/56 |
| 3,279,953 | 10/1966 | Bierdumpfel | 429/56 |
| 3,997,365 | 12/1976 | Feldhake | 429/185 |
| 4,282,293 | 8/1981 | van Lier | 429/174 |
| 4,307,158 | 12/1981 | Thibault | 429/185 |
| 4,345,611 | 8/1982 | Ikeda et al. | 429/56 |
| 4,732,825 | 3/1988 | Kamata et al. | 429/174 |
| 4,904,550 | 2/1990 | Kano et al. | 429/185 |
| 5,322,908 | 6/1994 | Hamazaki et al. | 525/445 |
| 5,342,662 | 8/1994 | Aoyama et al. | 428/34.8 |

FOREIGN PATENT DOCUMENTS 57-121075 7/1982 Japan .
62-259342 11/1987 Japan .

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

A nonaqueous battery comprising a positive electrode, a negative electrode and an electrolyte in a battery can having a cap, said cap having an opening and a sealing metal plate whose circumferential portion is supported by the cap. The sealing metal plate is supported by the cap via a layer of polymer material selected from the group consisting of a copolymer of an olefin and an acrylate ester or methacrylate ester which is grafted with maleic anhydride, a copolymer of an olefin and acrylic acid or methacrylic acid, and a copolymer of an olefin and an acrylate ester or methacrylate ester which is modified with a silane compound.

9 Claims, 2 Drawing Sheets

NONAQUEOUS BATTERY

This is a Continuation of application Ser. No. 08/274,026 filed Jul. 12, 1994, now abandoned.

FIELD OF THE INVENTION

This invention relates to a nonaqueous battery having a safety valve which comprises a sealing plate for sealing the opening for degassing.

BACKGROUND OF THE INVENTION

A nonaqueous battery using a metal ion such as lithium ion or sodium ion as electrolyte basically comprises a positive electrode, a negative electrode and an electrolyte in a battery can having a cap. The cap has an opening for degassing and a sealing metal plate whose circumferential portion is supported by the cap. In more detail, the sealing metal plate is fixed between the upper plate and the lower plate of the cap (the latter is also referred to as an opening sealing plate). In the nonaqueous battery, invasion of water into the battery brings about deterioration of active materials of the electrodes. Therefore, the battery is required to prevent water from invasion.

As a material of the sealing plate (i.e., valve plate or safety valve), a metal foil has been conventionally employed due to its low water permeability. However, the metal foil is poorly welded to the opening sealing plate, etc. and the resultant battery does not show a high air-tightness.

Japanese Utility Model Publication (Gazette) No. 59(1984)-15398 discloses the use of a sealing plate made of a laminate of a metal foil and a polymer film such as polyethylene or polypropylene.

Japanese Patent Provisional Publication No. 62(1987)-259342 discloses the use of a sealing plate made of a laminate of a metal foil and a polymer film of polyolefin in which an unsaturated carboxylic acid such as maleic anhydride is contained in the amount of 3–8 weight %. Examples of the metal foil include an aluminum foil of 20–30 μm, a nickel foil of 5–10 μm and a stainless steel foil of 8–10 μm. Examples of the polyolefin include graft copolymers obtained by grafting a unsaturated carboxylic acid (5 weight %) such as maleic anhydride, acrylic acid, methacrylic acid, itaconic acid or fumaric acid to polyolefin such as polyethylene or polypropylene. The laminate of a metal foil and the graft polymer is, for example, prepared by combining a metal foil and the graft polymer by use of a heated roller.

The use of the sealing plate made of a laminate of a metal foil and the graft polymer improves airtightness of a battery compared with one with a metal foil or a laminate of metal foil and polyethylene or polypropylene.

SUMMARY OF THE INVENTION

The present inventor has further studied the sealing plate made of a laminate of a metal foil and the graft polymer. It has been found that, when a battery is prepared using as a sealing plate the laminate of a metal foil and the graft polymer, pressure for working the sealing plate greatly varies with environmental temperature.

In more detail, in the case of using as a sealing plate a composite prepared by laminating an aluminum foil (25 μm) and a film (50 μm) of a graft polymer obtained by grafting maleic anhydride (5 weight %) to polyethylene or polypropylene by use of a heated roller, the working pressure of the sealing plate of the resultant battery indicates 20 kgw/cm² at 25° C. while it indicates 13 kgw/cm² at 80° C. and 33 kgw/cm² at −60° C. Thus, the working pressure varies with environmental temperature (between 80° C. and −60° C.), the working pressure at 80° C. being 2.5 times that at −60° C.

The nonaqueous battery is required to use over a wide temperature range (e.g., it is occasionally used in the polar region or desert). The working pressure should not greatly vary with environmental temperature. In more detail, at a high temperature, the sealing plate should not be easily broken or opened, while at a low temperature, it should not be hardly broken or opened.

For example, in the case that the working pressure is adjusted to 20 kgw/cm² so that the sealing plate may be easily broken or opened at a high temperature (80° C.), the working pressure at a low temperature (−60° C.) reaches 50 kgw/cm² to greatly increase danger of occurrence of explosion at an opened sealing portion of a battery. In contrast, in the case that the working pressure is adjusted to 20 kgw/cm² at a low temperature (−60° C.), the working pressure at a high temperature (80° C.) falls 8 kgw/cm² so that the valve sealing is easily broken or opened.

Hence, the working pressure at 80° C. is desired to be at most 1.5 times that at −60° C., from the viewpoint of assuring safety of the nonaqueous battery over a wide temperature range.

It is an object of the invention to provide a nonaqueous battery having assured safety.

Particularly, it is an object of the invention to provide a nonaqueous battery has high steamtightness and shows stable working of the sealing plate (safety valve) even under the conditions of high and low working temperatures.

The invention resides in a nonaqueous battery comprising a positive electrode, a negative electrode and an electrolyte in a battery can having a cap, said cap having an opening and a sealing metal plate whose circumferential portion is supported by the cap;

wherein said sealing metal plate is supported by the cap via a layer of polymer material selected from the group consisting of a copolymer of an olefin and an acrylate ester or methacrylate ester which is grafted with maleic anhydride, a copolymer of an olefin and acrylic acid or methacrylic acid, and a copolymer of an olefin and an acrylate ester or methacrylate ester which is modified with a silane compound.

Preferred embodiments of the above nonaqueous battery are as follows:

1) The nonaqueous battery wherein the polymer material has the following formula (1):

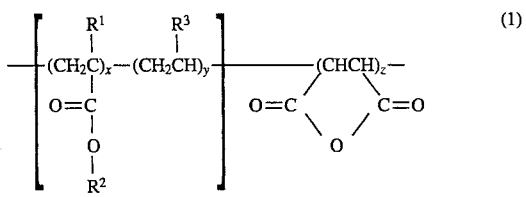

wherein $R^1$ represents hydrogen, methyl or ethyl; $R^2$ represents an alkyl group of 1 to 12 carbon atoms, an aryl group of 6 to 12 carbon atoms or an aralkyl group of 7 to 13 carbon atoms; $R^3$ represents hydrogen, methyl or ethyl; x represents is in the range of 2 to 40 weight %; y represents is in the range of 60 to 98 weight %; and z is in the range of 0.1 to 10 weight % based on the total weight of the copolymer.

2) The nonaqueous battery above 1) wherein the polymer material is selected from the group consisting of ethylene-ethyl acrylate copolymer grafted with maleic anhydride, propylene-ethyl acrylate copolymer grafted with maleic anhydride, butylene-methyl acrylate copolymer grafted with maleic anhydride, ethylene-benzyl methacrylate copolymer grafted with maleic anhydride and ethylene-isobutyl methacrylate copolymer grafted with maleic anhydride.

3) The nonaqueous battery wherein the polymer material has the following formula (2):

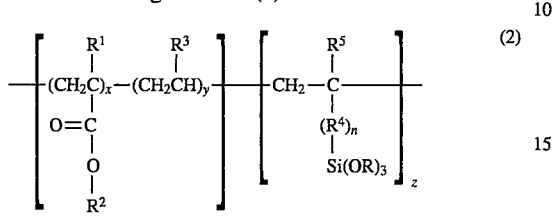

wherein $R^1$ represents hydrogen, methyl or ethyl; $R^2$ represents an alkyl group of 1 to 12 carbon atoms, an aryl group of 6 to 12 carbon atoms or an aralkyl group of 7 to 13 carbon atoms; $R^3$ represents hydrogen, methyl or ethyl; $R^4$ represents a divalent connecting group; $R^5$ is hydrogen or methyl; n is 0 or 1, OR is a group capable of being hydrolyzed; x is in the range of 5 to 40 weight %; y is in the range of 60 to 95 weight %; and z is in the range of 0.1 to 10 weight % based on the total weight of the copolymer.

4) The nonaqueous battery above 3) wherein the polymer material is selected from the group consisting of ethylene-ethyl acrylate copolymer grafted with γ-methacryloxypropyltrimethoxysilane, propylene-ethyl acrylate copolymer grafted with vinyltriacetoxysilane, butylene-methyl acrylate copolymer grafted with acryloxymethyltriethoxysilane, ethylene-benzyl methacrylate copolymer grafted with vinyltriethoxysilane and ethyleneisobutyl methacrylate copolymer grafted with N-β-(N-vinylbenzylaminoethyl)-γ-aminopropyl-methoxysilane.

5) The nonaqueous battery wherein the polymer material has the following formula (3):

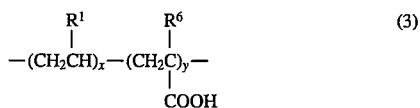

wherein $R^1$ represents hydrogen, methyl or ethyl; $R^6$ represents hydrogen or methyl; x is in the range of 60 to 99 weight %; and y is in the range of 1 to 40 weight %.

6) The nonaqueous battery above 5) wherein the polymer material is selected from the group consisting of ethylene-methacrylic acid copolymer, ethylene-acrylic acid copolymer, propylene-acrylic acid copolymer, propylene-methacrylic acid copolymer, and butylene-methacrylic acid copolymer.

7) The nonaqueous battery wherein the layer of polymer material is coated over the sealing metal plate on its lower side.

8) The nonaqueous battery wherein the layer of polymer material has a thickness of 5 to 300 μm (preferably 5 to 100 μm).

9) The nonaqueous battery wherein said sealing metal plate has a thickness of 5 to 300 μm.

10) The nonaqueous battery wherein the sealing metal plate is made of metal selected from the group consisting of aluminum, stainless steel, copper, and titanium.

11) The nonaqueous battery wherein said cap has a cuttur whose tip is arranged in the vicinity of the sealing metal plate.

12) The nonaqueous battery wherein the layer of polymer material is provided only on the circumferential portion of the sealing metal plate.

13) The nonaqueous battery wherein polymer material is a copolymer of an olefin and an acrylate ester or methacrylate ester which is grafted with maleic anhydride, or a copolymer of an olefin and an acrylate ester or methacrylate ester which is modified with a silane compound.

14) The nonaqueous battery wherein the polymer is a copolymer of an olefin and an acrylate ester or methacrylate ester which is modified with a silane compound.

15) The nonaqueous battery wherein the layer of polymer material is a coated layer.

16) The nonaqueous battery which is a nonaqueous secondary battery.

The nonaqueous battery of the invention has a high steamtightness and shows stable working of the sealing plate (safety valve) under the conditions of high and low working temperatures.

In the battery of the invention, the layer of the specific polymer material is provided at least between the sealing metal plate and the lower plate of the cap. The specific polymer material shows flexibility over a wide temperature range from high to low temperatures. Therefore, the sealing properties of the sealing plate almost do not vary under the conditions of high and low temperatures. Further, since a bonding strength between the layer of polymer material and the sealing metal plate is enhanced, the resultant nonaqueous battery shows high steamtightness. Furthermore, the polymer has the high resistance to an electrolytic solution so that its use brings about high durability of the battery.

Thus, the nonaqueous battery of the invention has high steamtightness and shows stable working of the sealing plate (safety valve) even under the conditions of high and low working temperatures.

Particularly, use of the polymer material of the invention enables formation of a thin layer by the use of coating method, so that an easily available metal foil that does not have extremely thin thickness (not more than 20 μm) can be employed as a metal sealing plate. Hence, use of such metal foil brings about good handling in the preparation of a composite of the layer of polymer material and the metal foil.

DETAILED DESCRIPTION OF THE INVENTION

The nonaqueous battery of the invention has a basic structure which comprises a positive electrode, a negative electrode and an electrolyte in a battery can having a cap. The cap has an opening for degassing and a sealing metal plate whose circumferential portion is supported by the cap.

Figure 1:
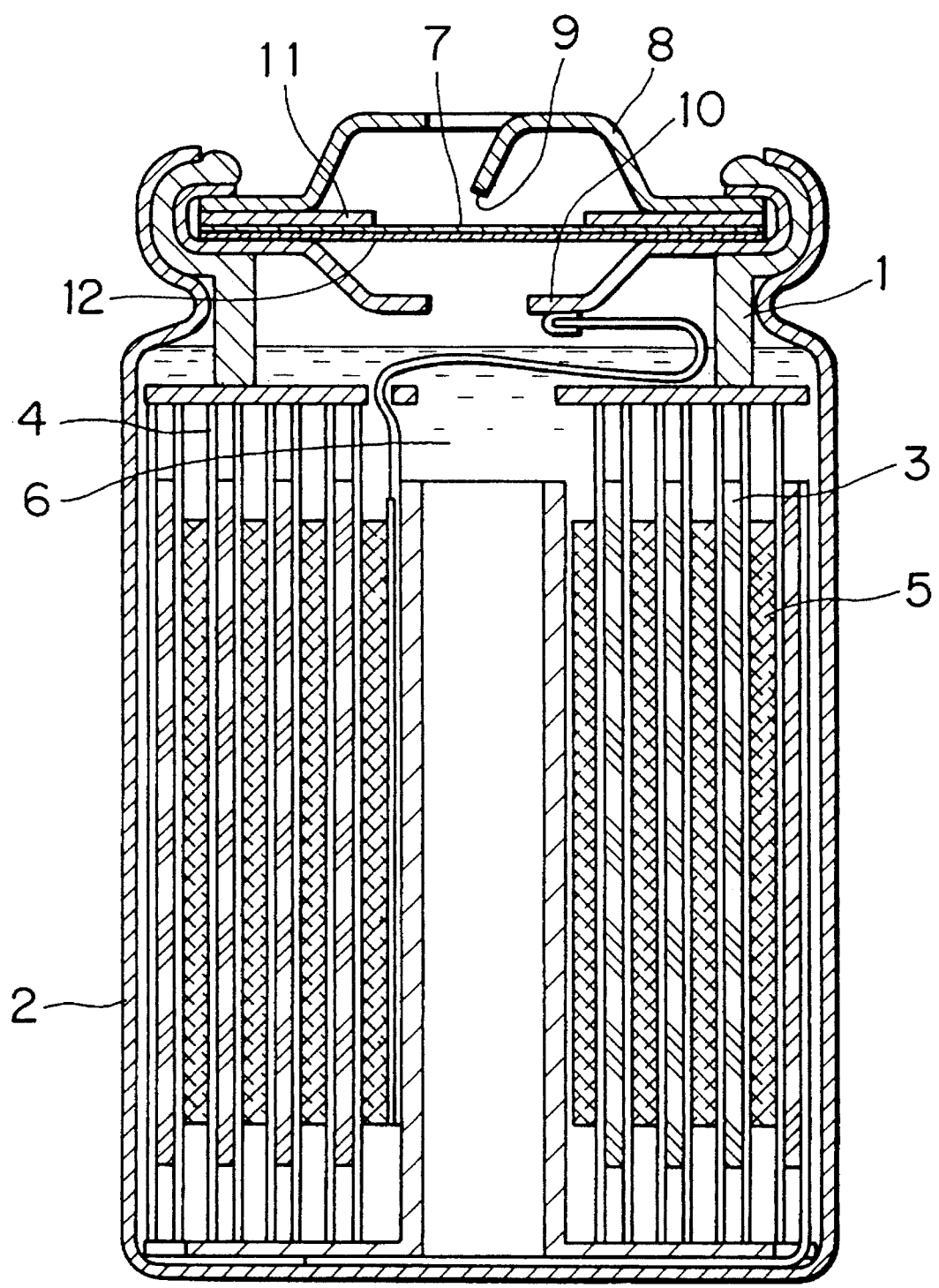
FIG. 1 is a schematic sectional view of a typical battery of circular cylinder-type according to the invention.

FIG. 1 shows a schematic sectional view of a typical battery of the circular cylinder-type according to the invention. In FIG. 1, a positive electrode 5, a separator 4 and a negative electrode 3, which have a sheet shape, are superposed in order and are spirally wound to form a wound composite. The composite is housed in a cylindrical battery can (negative electrode can) 2 having a bottom. On an lower plate of a cap (opening sealing plate) 10 whose outside edge is not bent, a metal foil 7 having a layer of polymer material 12 for sealing an opening, a ring 11 and an upper plate of a cap 8 (for a positive electrode) are arranged, and the outside edge of the lower plate of a cap 10 is bent so as to cover and fix the edges of the sealing metal plate 7, the ring 11 and the upper plate of a cap 8 to prepare an assembled cap. In FIG. 1, the assembled cap is caulked on an upper opening portion of the battery can 2 through a gasket (opening sealing body) 1.

The sealing plate comprising the sealing metal plate 7 having the layer of polymer material 12 on its whole surface is obtained by forming the layer on a metal foil (sheet) and cutting the composite. Therefore, the preparation of the sealing plate can be performed in high productivity.

Figure 2:
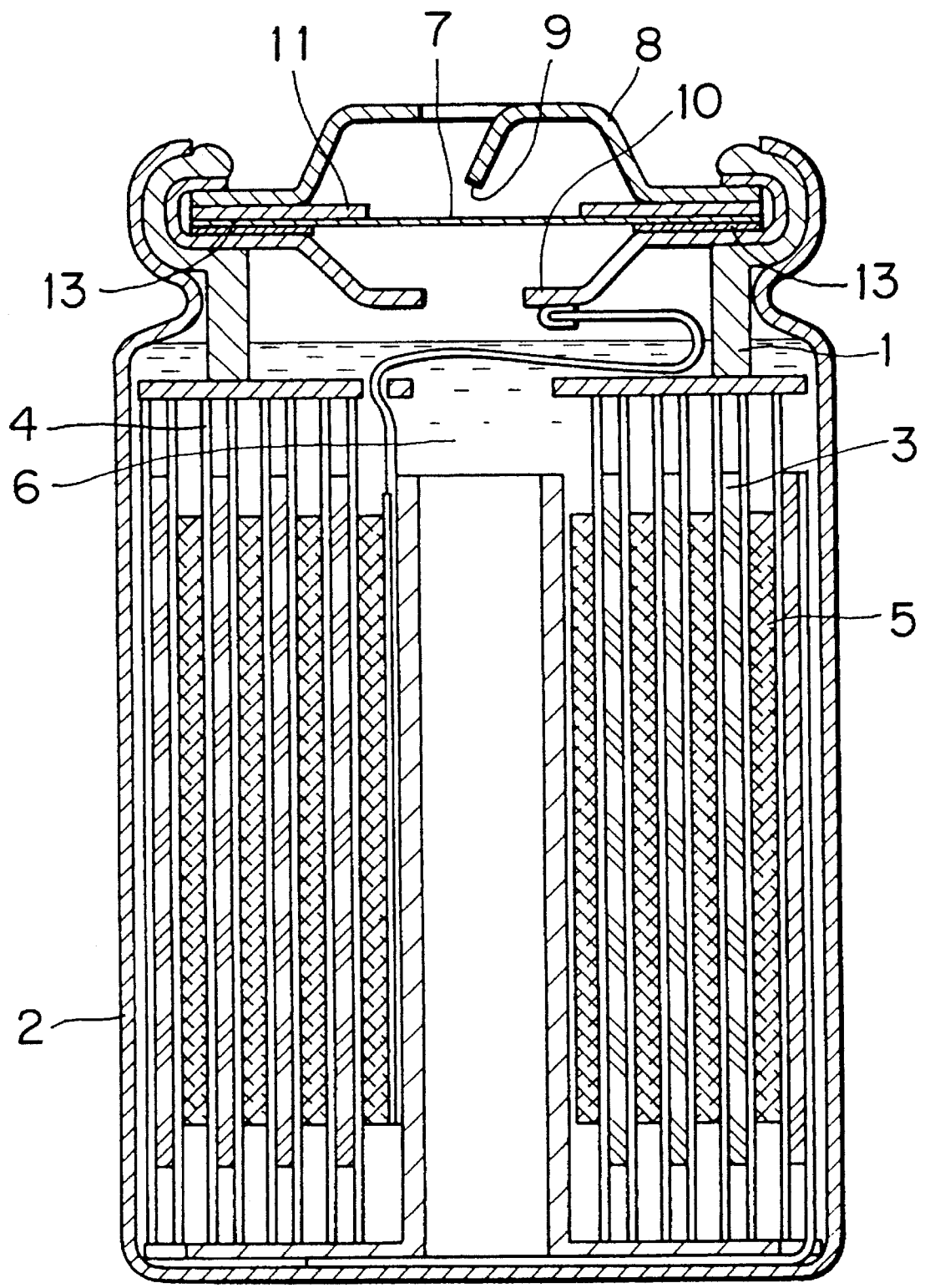
FIG. 2 is a schematic sectional view of another typical battery of circular cylinder-type according to the invention.

FIG. 2 shows a schematic sectional view of another typical battery of circular cylinder-type according to the invention. The battery is the same as one in FIG. 1 except an area where the layer of polymer material is formed. In more detail, the layer of polymer material 13 is provided on the outside of the sealing metal plate 7 (i.e., an area to be brought into contact with the lower plate of a cap 10).

It has been first made possible by using the polymer material of the invention to form the layer of polymer material on the outside of the sealing metal plate or the lower plate of the cap. Such method by coating is suitable for a small amount of production of a sealing plate.

In the nonaqueous battery of the invention, the sealing metal plate is supported by the cap via the layer of the specific polymer material as mentioned above.

The polymer materials are:

(a) olefin-(meth)acrylate ester copolymer grafted with malic anhydride, (b) silane-modified olefin-(meth)acrylate ester copolymer, and (c) olefin-(meth)acrylic acid copolymer, The layer of polymer material provided on a surface of the sealing metal plate preferably has a thickness of 5 to 300 μm, preferably 5 to 300 μm and more preferably 10 to 40 μm.

The olefin-(meth)acrylate copolymer grafted with maleic anhydride (a) is a grafted copolymer obtained by grafting maleic anhydride to a copolymer of an olefin monomer and at least one monomer selected from the group consisting of acrylate esters and methacrylate esters. The grafted copolymer preferably has the following formula (1):

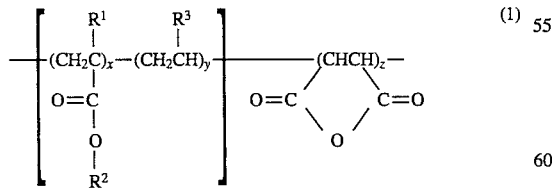
(1)

wherein $R^1$ represents hydrogen, methyl or ethyl; $R^2$ represents an alkyl group of 1 to 12 carbon atoms, an aryl group of 6 to 12 carbon atoms or an aralkyl group of 7 to 13 carbon atoms; $R^3$ represents hydrogen, methyl or ethyl; x represents weight % of the acrylate unit and is in the range of 2 to 40 weight %; y represents weight % of the olefin unit and is in the range of 60 to 98 weight % (x+y=100); and z represents weight % of the maleic anhydride unit and is in the range of 0.1 to 10 weight % based on the total weight of the copolymer (the olefin unit and the acrylate unit).

In the formula (1), $R^1$ preferably is hydrogen or methyl, $R^2$ preferably is an alkyl group of 1 to 4 carbon atoms and more preferably methyl or ethyl, and $R^3$ preferably is hydrogen or methyl and more preferably is hydrogen. "x" preferably is in the range of 3 to 30 weight %, and more preferably in the range of 5 to 20 weight %. "z" preferably is in the 0.3 to 5 weight % and more preferably in the range of 0.7 to 1.5 weight %. A part of the maleic anhydride may open its ring.

The graft copolymer of the formula (1) is, for example, prepared by adding maleic anhydride and a polymerization initiator (radical generating agent) to the olefin(meth)acrylate copolymer (comprising the olefin unit and the acrylate unit) dissolved or dispersed in an appropriate solvent and heating them with stirring; or by mixing the olefin-(meth)acrylate copolymer, maleic anhydride and a polymerization initiator and melting the mixture by the use of an extruder, banbury mixer or kneader. Thus, maleic anhydride (monomer to be grafted) can be bonded to the copolymer in the form of pendant. The processes for preparation of the graft copolymer is described in Japanese Patent Provisional Publication No. 60(1985)-10559.

Examples of materials of the polymerization initiator include organic peroxides such as benzoyl peroxide and lauroyl peroxide. The polymerization initiator is used in the amount of 0.001 to 0.5 weight % based on the weight of the copolymer. The maleic anhydride is used in the amount of 0.1 to 10 weight % based on the weight of the copolymer.

Preferred examples of the graft copolymers of the formula (1) are as follows:

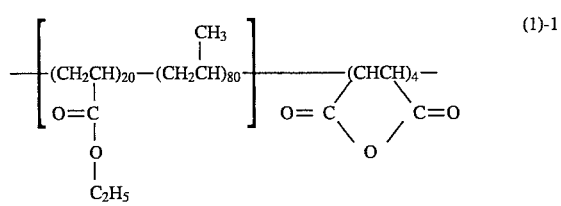
(1)-1

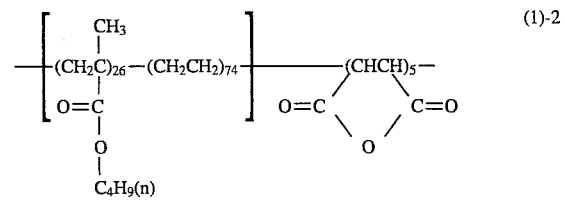
(1)-2

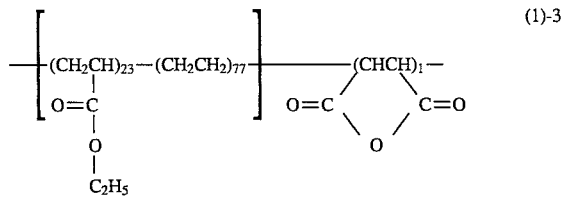
(1)-3

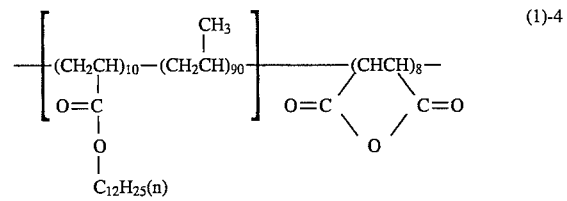
(1)-4

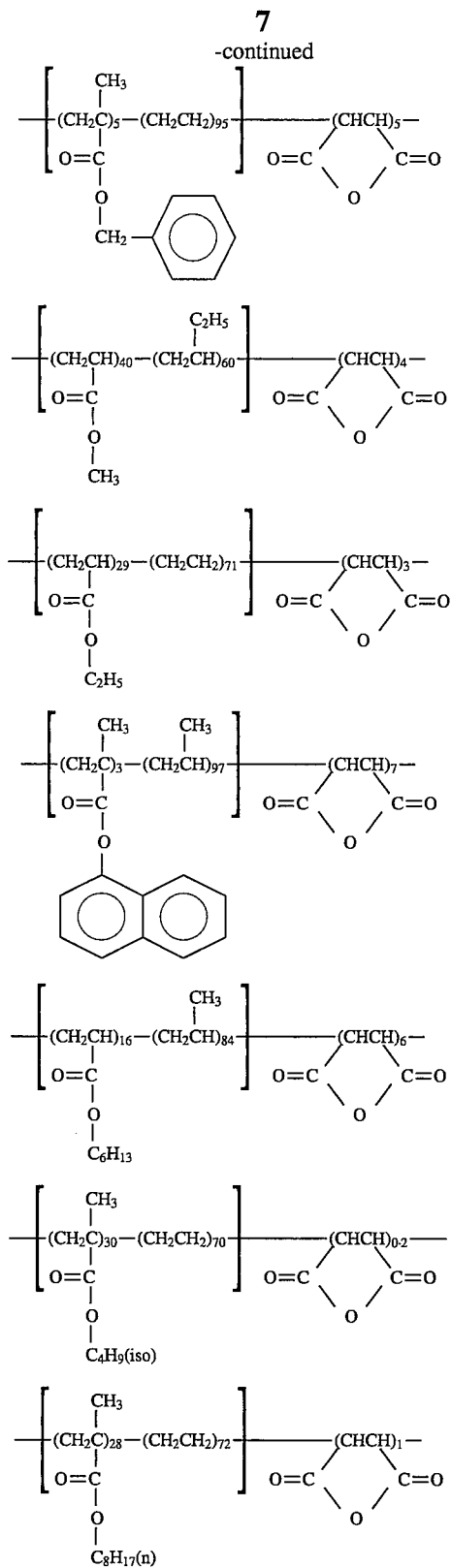

(1)-5
(1)-6
(1)-7
(1)-8
(1)-9
(1)-10
(1)-11

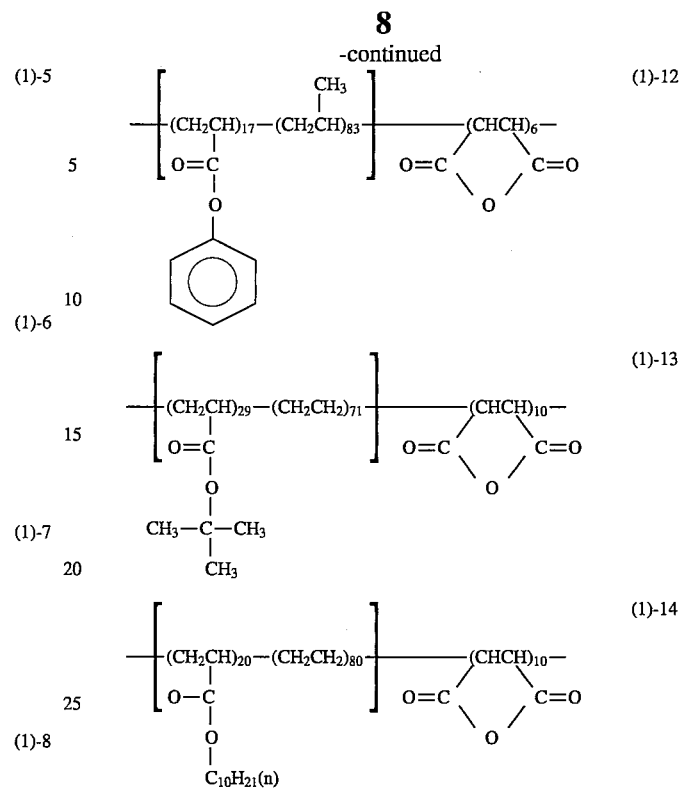

(1)-12
(1)-13
(1)-14

The silane-modified olefin-(meth)acrylate ester copolymer (b) is olefin(meth)acrylate ester copolymer grafted with a silane compound. Preferably, the silane-modified olefin-(meth)acrylate ester copolymer is a grafted copolymer obtained by grafting a polymerizable silane compound to a copolymer of an olefin monomer and at least one monomer selected from the group consisting of acrylate esters, methacrylate esters. The silane-modified copolymer preferably has the following formula (2):

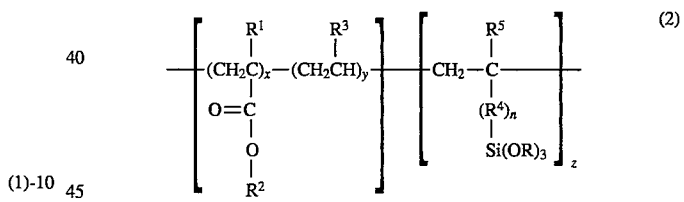

wherein $R^1$ represents hydrogen, methyl or ethyl; $R^2$ represents an alkyl group of 1 to 12 carbon atoms, an aryl group of 6 to 12 carbon atoms or an aralkyl group of 7 to 13 carbon atoms; $R^3$ represents hydrogen, methyl or ethyl; $R^4$ represents a divalent connecting group, $R^5$ is hydrogen or methyl, n is 0 or 1, and OR is a group capable of being hydrolyzed. "x" represents weight % of the acrylate unit and is in the range of 5 to 40 weight %; "y" represents weight % of the olefin unit and is in the range of 60 to 95 weight % (x+y=100); and "z" represents weight % of the silane compound unit and is in the range of 0.1 to 10 weight % based on the total weight of the copolymer (the olefin unit and the acrylate unit).

In the formula (2), $R^1$ preferably is hydrogen or methyl, $R^2$ preferably is an alkyl group of 1 to 4 carbon atoms and more preferably methyl or ethyl, and $R^3$ preferably is hydrogen or methyl and more preferably is hydrogen. "x" preferably is in the range of 3 to 30 weight %, and more preferably in the range of 5 to 20 weight %. "z" preferably is in the range of 0.1 to 10 weight %, more preferably in the range of 0.3 to 5 weight % and most preferably in the range of 0.8 to 3 weight %. In the case that n is 1, $R^4$ preferably is a divalent group selected from the group consisting of an alkylene group of 1 to 5 carbon atoms, an alkylenecarbonyloxy group of 2 to 6 carbon atoms, and an alkylene group of 1 to 8 carbon atoms or an alkylenecarbonyloxy group of 2 to 9 carbon atoms which has phenylene and/or imino. Preferred examples represented by $R^4$ include —OCO—, —OCOCH$_2$—, —OCO(CH$_2$)$_3$— and —C$_6$H$_4$—CH$_2$—NH(CH$_2$)$_2$—NH(CH$_2$)$_3$—. Further, it is also preferred that "n" is 0. OR preferably is alkoxy or alkoxycarbonyl of 1 to 5 carbon atoms and more preferably methoxy, ethoxy and acetoxy. A part of OR may be hydrolyzed to form a hydroxyl group.

The silane-modified olefin-(meth)acrylate copolymer (b) is generally prepared in the same manner as the malic anhydride grafted olefin-(meth)acrylate ester (a).

The polymerizable silane compound employed for grafting or modifying the copolymer or copolymerizing other monomers is generally a silane coupling agent. Examples of the silane coupling agents include γ-(methacryloxy-propyl)trimethoxy silane, γ-(methacryloxypropyl)triethoxy silane, γ-(acryloxypropyl)trimethoxy silane, γ-(acryloxypropyl)triethoxy silane, vinyltrimethoxy silane, vinyltriethoxy silane, vinyltriacetoxy silane and N-β-(N-vinylbenzylaminoethyl)-γ-aminopropyltrimethoxy silane.

The silane-modified olefin-(meth)acrylate ester copolymer contains a unit of the silane coupling agent in the amount of 0.1 to 10 weight % based on the olefin(meth)acrylate ester copolymer (e.g., copolymer before grafted), more preferably in the range of 0.3 to 5 weight % and most preferably in the range of 0.8 to 3 weight %.

Preferred examples of the silane-modified-olefin/(meth)acrylate copolymer of the formula (2) are as follows:

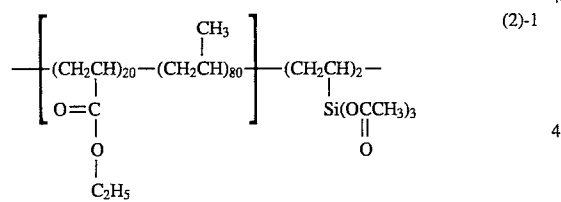

(2)-1

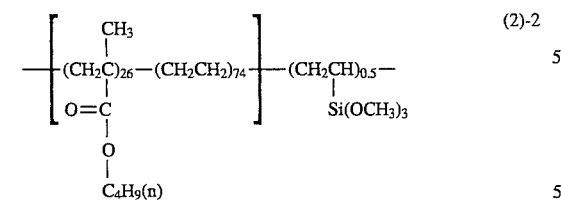

(2)-2

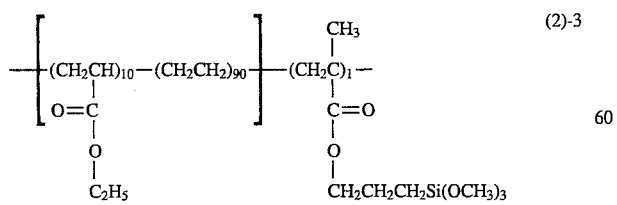

(2)-3

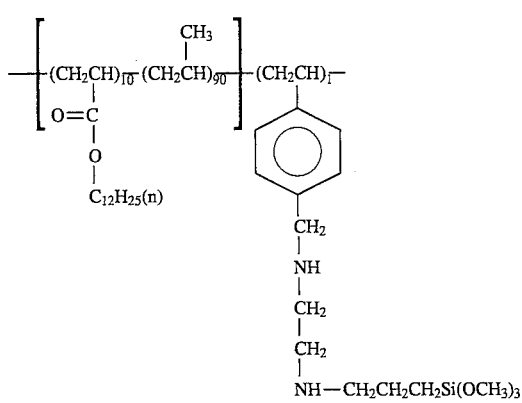

(2)-4

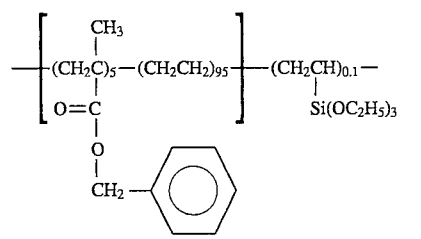

(2)-5

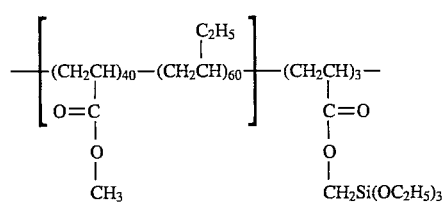

(2)-6

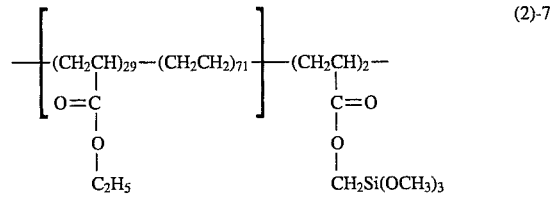

(2)-7

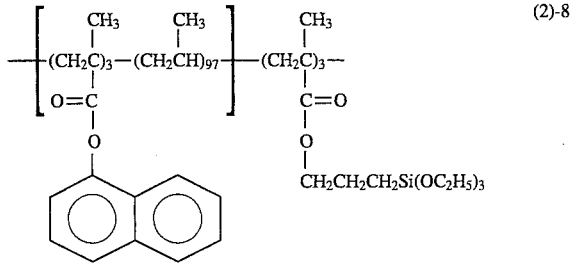

(2)-8

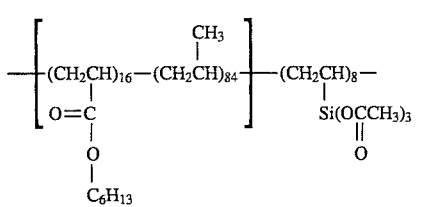

(2)-9

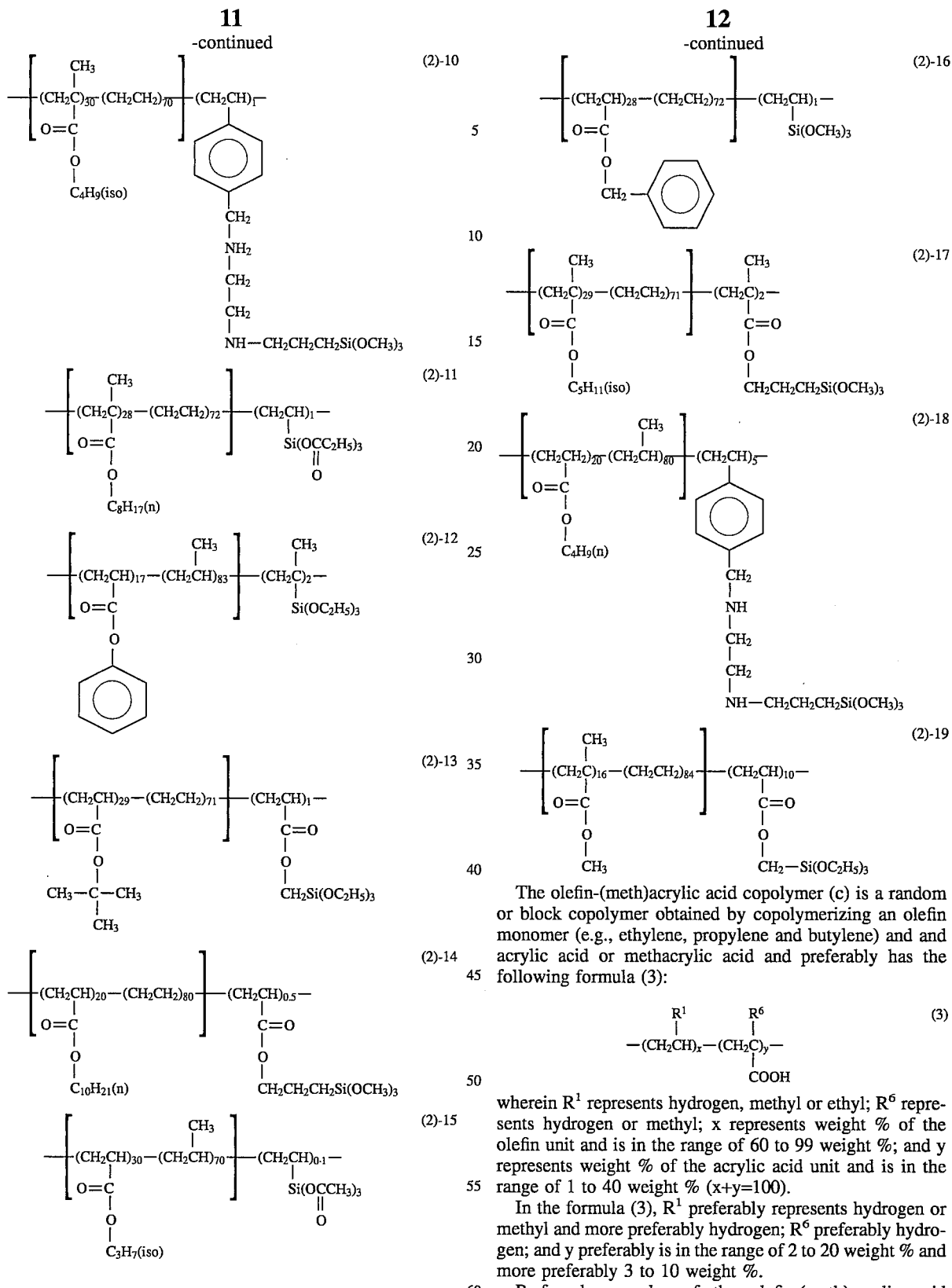

The olefin-(meth)acrylic acid copolymer (c) is a random or block copolymer obtained by copolymerizing an olefin monomer (e.g., ethylene, propylene and butylene) and and acrylic acid or methacrylic acid and preferably has the following formula (3):

$$-(CH_2CH)_x-(CH_2\underset{\underset{COOH}{|}}{\overset{\overset{R^6}{|}}{C}})_y- \qquad (3)$$

$$\phantom{-(CH_2CH)_x-(CH_2}\overset{R^1}{|}$$

wherein $R^1$ represents hydrogen, methyl or ethyl; $R^6$ represents hydrogen or methyl; x represents weight % of the olefin unit and is in the range of 60 to 99 weight %; and y represents weight % of the acrylic acid unit and is in the range of 1 to 40 weight % (x+y=100).

In the formula (3), $R^1$ preferably represents hydrogen or methyl and more preferably hydrogen; $R^6$ preferably hydrogen; and y preferably is in the range of 2 to 20 weight % and more preferably 3 to 10 weight %.

Preferred examples of the olefin-(meth)acrylic acid copolymer of the formula (3) are as follows:

$$-(CH_2CH_2)_{92}-(CH_2CH)_8- \qquad (3)\text{-}1$$
$$\phantom{-(CH_2CH_2)_{92}-(CH_2}|$$
$$\phantom{-(CH_2CH_2)_{92}-(CH}COOH$$

-continued

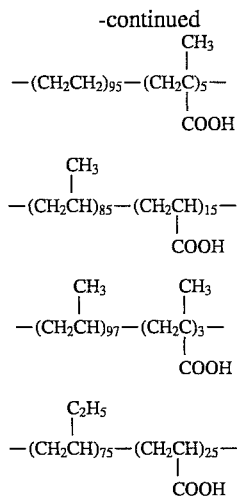

In the invention, a sealing metal plate has the layer of polymer material provided thereon as mentioned above. Examples of the sealing metal plate include an aluminum foil, a nickel foil, a stainless steel foil, a copper foil, a titanium foil or a glass plate. Preferred examples include an aluminum foil, a nickel foil, a stainless steel foil, a copper foil and a titanium foil. Particularly, the aluminum foil is preferred. A thickness of the sealing metal plate generally 5 to 300 μm, preferably 5 to 100 μm and more preferably 30 to 100 μm. A thickness of the aluminum foil usually is 5 to 300 μm, that of the nickel foil is 5 to 100 μm, that of the stainless steel foil is 8 to 50 μm, that of the copper foil is 5 to 100 μm, that of the titanium foil is 5 to 50 μm, and that of the glass plate is 10 to 500 μm.

Preferred examples of materials of the aluminum foil include 1000-type (pure aluminum type), 2000-type (Al-Cu type; particularly 2017 and 2024), 3000-type (Al-Mn type), 4000-type (Al-Si type), 5000-type (Al-Mg type), 6000-type (Al-Mg-Si type) and 7000-type (Al-Zn type). The symbols of these examples are represents by International Aluminum Alloy Symbol. Further, the materials of the 1000-type are preferred and particularly the 1000-type materials such as 1085, 1080, 1070, 1060, 1050, 1N30, 1100, 1200, 1N00, 1N99, 1N90 and 1230 are preferred. 1N30 is most preferred.

As for nature of hardness of aluminum materials, preferred are materials represented by symbols (symbol representing nature of aluminum material) of F, H112, O, H1, H2, H3, HX1, HX2, HX3, HX4, HX5, HX6, HX7, HX8, HX9, T1, T2, T3, T4, T5, T6, T7, T8, T9, T10, T31, T351, T3511, T361, T37, T42, T451, T4511, T61, T62, T651, T652, T73, T7352, T74, T7452, T81, T83, T851, T852, T861 and T87. Particularly preferred is the material represented by O that is tempered at temperature over 350° to 500° C. A thickness of the aluminum foil preferably is in the range of 7 to 300 μm, more preferably 10 to 150 μm and most preferably 13 to 120 μm.

The sealing metal plate is supported by the cap via the layer of polymer material. Typical examples of the sealing plates of the invention includes the sealing metal plate having the layer of polymer material provided on its outside and the sealing metal plate having the layer of polymer material provided on its whole surface, as mentioned above.

The sealing plate bends with increase of internal pressure of a battery to work as a safety valve. The sealing is broken, for example, by breakage at a central portion or an edge of the sealing plate, or damage of an electric contact point, a lead tab or an external electric contact point due to deformation of the sealing plate.

In order to work the sealing plate as the safety valve, the sealing plate may utilize an auxiliary means for the working. Examples of the means include:

1) at least one groove in the form of circle, arc, straight line, polygon, star or cross is formed on the sealing plate (e.g., a central portion of the sealing plate, or its outside surface of the hole side or opposite the hole);
2) pressure or load is applied to the sealing plate so as to impart ductility;
3) the sealing plate is treated with hydrogen or $NH_3$ gas so as to have ductility; and
4) one or more blade (for cutting the sealing plate) is provided on the side opposite the hole.

Provision of the cutter above 4) is preferred. Examples of materials of the cutter include stainless steal, nickel-plated iron, nickel-plated stainless steal and glass. The cutter has a point having R (mm; diameter) defined below. R represents a diameter obtained by approximating a curved surface of the edge portion to a circle or cube. For example, R represents a diameter of the point when the cutter has a circular cone, circular cylinder or column; a diameter of the point in the plate direction when the blade is in the form of plate; or a maximum diameter of the point when the cutter has a polygonal column. R generally is in the range of 0.001 to 2 mm, preferably 0.01 to 0.5 mm and more preferably 0.15 to 0.25 mm. A distance between the point of the cutter and the sealing plate generally is 0.01 to 0.5 times the thickness of the sealing plate, preferably 0.05 to 0.2 times and more preferably 0.08 to 0.10 times.

The cutter may have one point, and two branched points. Otherwise, two cutters may be arranged in the vicinity of the sealing plate.

An auxiliary ring in the form of doughnut is preferably provided on the side opposite the hole of the sealing plate. The ring may be provided with a sharp projection to aiding the working of the safety valve.

In the invention, the sealing plate of the invention comprises the sealing metal plate and the layer of polymer material provided on its whole surface facing the lower plate of the cap. Otherwise, the sealing plate comprises the sealing metal plate and the layer provided on its circumferential portion or an circumferential portion of the lower plate of the cap. Thus, the layer is in contact with at least an outside area of the lower plate of the cape.

Provision of the layer of polymer material on the sealing metal plate, for example, is conducted in the following manner. A layer containing the specific polymer mentioned previously is formed so as to preferably have a thickness of 5 to 300 μm, and the obtained film is laminated on the metal foil to prepare a sealing plate. Otherwise, the layer containing the specific polymer is directly formed on the metal foil (sheet). The latter method is preferred. In this case, the film of which central portion is cut may be laminated on the sealing metal plate, or a central portion of the film may be cut off from the sealing plate (composite).

Otherwise, a composition containing the specific polymer material is melted under heating to prepare a melted mixture for coating, or a composition containing the polymer material is dissolved or dispersed in an appropriate solvent to prepare a coating solution. The mixture or solution is coated on the metal foil. In the invention, the coating method is preferably utilized. Examples of the coating method include a method using a needle nozzle or a circular spray nozzle, a gravure printing, a screen printing, a pad printing and an extrusion coating. The layer of polymer material may be formed on the sealing metal plate using the above coating method in such a manner that a thickness of a central portion has 0 to 0.8 times that of the outside portion. For example, the layer of polymer material is formed so as to preferably have a thickness of 5 to 300 μm, and the obtained film is laminated on the outside portion of the sealing metal plate after the film of which central portion (corresponding to the hole) is cut or before a central portion of the film is cut off from the sealing plate (composite).

Otherwise, in the invention, the layer of polymer material is formed on the lower plate of the cap, and on the layer, the sealing metal plate is arranged. For example, the polymer layer is formed so as to preferably have a thickness of 5 to 300 μm, and the obtained layer is laminated on the lower plate of the cap before or after the central portion of the layer is cut off. Subsequently, a sealing metal plate is laminated on the layer of polymer material to fix it on the lower plate of the cap. Otherwise, the above mixture or solution is coated on the lower plate of the cap to form the layer of polymer material. A sealing metal plate is laminated on the layer to fix it on the lower plate of the cap. Thus, the sealing metal plate has the layer of polymer material on its lower side (i.e., on a portion to be brought into contact with the lower plate of the cap).

Coating of the coating solution for the layer of polymer material is, for example, conducted in the following manner. The lower plate of the cap or the sealing metal plate which is placed horizontally or with leaned 15 to 45 degree from the horizon, is rotated at 10 to 6,000 rpm. On the rotating lower plate of the cap (e.g., outside portion of the opening) or the sealing metal plate, the coating solution is intermittently sprayed using a nozzle for spray and a pump for feeding the solution. Examples of the pump include a flange pump, a rotary pump, a wiping pump, a cylinder-type pump, a gear pump, a mono pump and a liquid surface gas-pressing pump (pump utilizing a method of suppressing a liquid surface by the use of gas under pressure). Instead of the pump, a naturally dropping force and capillarity may be utilized. Examples of the nozzle include circular spray nozzles such as a needle nozzle, a multi-needle nozzle, a nozzle having a section view of long ellipse and a nozzle having a section view of ellipse, and liquid-repellant treated nozzles such as a nozzle having a fan-shaped tip and a nozzle having a tip of curved surface. The intermittent spray is performed, for example, by the steps of feeding the coating solution into the nozzle which is mounted with leaned at 30 to 45 degree from the horizon; and intermittently spraying (coating) the solution on the lower plate of the cap by switching on and off the stream of the solution through opening and shutting a valve attached at a location just before the nozzle, through switching on and off a shutter attached in front of the nozzle, or through switching on and off movement of wiping, piston or mono, gear revolution, or liquid surface pressure.

Otherwise, the solution may be coated on the lower plate of the cap (e.g., outside portion of the opening) or the metal foil by use of a gravure printing, a screen printing or a pad printing and an extrusion coating. Further, the coating may be conducted by moving the nozzle (e.g., rotating it so as to draw circle) or by extrusion coating.

In the invention, it is preferred that the layer of polymer material is formed by the coating method.

The coating solution or mixture for forming the layer of polymer material may contain the following additives other than the above mentioned polymer ((a), b) or c)).

Preferred examples of the additives include pitch such as asphalt or coal tar, and a mixture the pitch and other material. Examples of other materials include mineral oil, silicone rubber, thermoplastic or thermosetting resin such as polyvinyl acetate or atactic polypropylene, rubber latex (one obtained by suspending rubber such as styrene/butadiene rubber, butadiene rubber, chloroprene rubber, ethylene/propylene rubber or a mixture thereof together with a surface active agent in water), rubber containing no silicon such as natural rubber (NR), isoprene rubber (IR), butadiene rubber (BR), 1,2-polybutadiene (1,2-BR), styrene/butadiene rubber (SBR), chloroprene rubber (CR), nitrile rubber (NBR), butyl rubber (IIR), ethylene/propylene rubber (EPM, EPDM), chlorosulfonated polyethylene (CSM) or acrylic rubber (ACM, ANM). Further, the solution preferably contain clay mineral such as montmorillonite group mineral.

The additive is mixed with the polymer material, or is dissolved it (under heating if desired) in water, a polar solvent or a nonpolar organic solvent to be mixed with the polymer. The mixture is then (after remove of impurities by filtration and sedimentation if desired) set to an appropriate viscosity by adjusting its concentration and temperature to prepare a coating solution. The coating solution is coated at the temperature and dried to form a coated layer. Examples of the solvent include toluene, xylene, cyclohexane, hexane, chloroform, dichloroethane, dichloromethane and a mixture thereof.

Active materials of the positive electrode employable for the invention may be any materials so long as they are employed for a nonaqueous battery. As the materials, the following inorganic compounds and organic compounds can be generally employed. Examples of the inorganic compounds include Co oxides (Japanese Patent Provisional Publication No. 52(1977)-12422 and DE Patent Provisional Publication No. 2,606,915), Li-Co oxides (U.S. Pat. Nos. 3,945,848 and 4,340,652), Li-Ni-Co oxides (EP Provisional Publication No. 243,926A, Japanese Patent Provisional Publications No. 63(1988)-114063, No. 63(1988)-211565, No. 63(1988)-299056 and No. 1(1989)-120765), V oxides (FR Patent Provisional Publication No. 21,611,796 and Japanese Patent Provisional Publications No. 55(1980)-53077, No. 62(1987)-140362 and No. 62(1987)-227358), Li-V oxides (Electrochemistry, vol. 48, 432, 1980; Journal of Electrochemical Society, vol. 130, 1225, 1983; and Japanese Patent Provisional Publication No. 2(1990)-12769), Mn oxides (EP Provisional Publication No. 269855 and Japanese Patent Provisional Publication No. 63(1988)-58761), Li-Mn oxides (Japanese Patent Provisional Publications No. 56(1981)-136464, No. 56(1981)-114064, No. 56(1981)-114065, No. 56(1981)-148550, No. 56(1981)-221559, No. 1(1989)-5459, No. 1(1989)-109662, No. 1(1989)-128371, No. 1(1989)-209663 and No. 2(1990)-27660) and Li-Ni-Mn oxides (Japanese Patent Provisional Publication No. 63(1988)-210028).

Examples of the organic compounds include polyaniline derivatives (Molecular Crystal and Liquid Crystal, vol. 121, 173, 1985; and Japanese Patent Provisional Publications No. 60(1985)-197728, No. 63(1988)-46233, No. 63(1988)-243131 and No. 2(1990)-219823), pyrrole derivatives (Journal of Chemical Society Chemical Communication, 854, 1979; DE Patent Provisional Publications No. 3,223, 544A3A and No. 307,954A; and Japanese Patent Provisional Publications No. 62(1987)-225517, No. 63(1988)-69824 and No. 1(1989)-170615), polythiophene derivatives (Japanese Patent Provisional Publications No. 58(1983)-187432 and No. 1(1989)-12775), polyamine derivatives (Japanese Patent Provisional Publication No. 58(1983)-209864), and polyparaphenylene derivatives. These derivatives include copolymers. These derivatives are described in detail in "Conductive Polymer" edited by N. Ogata (published by KODANSYA SCIENTIFIC, 1990).

Active materials of the negative electrode employable for the invention may be any materials so long as they are employed for a nonaqueous battery. Examples of the active materials include lithium metal and its alloys, lithium-aluminum alloys, burned carbonaceous materials (Japanese Patent Provisional Publication No. 58(1983)-209864), $TiS_2$ and $LiTiS_2$ (U.S. Pat. No. 3,983,476), $WO_2$ (U.S. Pat. No. 4,198,476), spinel compounds such as $Li_xFe(Fe_2)O_4$ (U.S. Pat. No. 4,507,371), lithium compounds of $Fe_2O_3$ (Japanese Patent Provisional Publication No. 3(1991)-112070), $Nb_2O_5$ (Japanese Patent Publication No. 62(1987)-59412 and Japanese Patent Provisional Publication No. 2(1990)-82447), iron oxide, FeO, $Fe_2O_3$, $Fe_3O_4$, cobalt oxide, CoO, $Co_2O_3$, $Co_3O_4$ (Japanese Patent Provisional Publication No. 3(1991)-291862), and lithium-containing transition metal oxides (preferably those represented by $Li_xM^1{}_yM^2{}_{1-y}O_z$ in which $M^1$ is Co, Ni or Zn, $M^2$ is V or Nb, x is in the range of 0 to 3, y is in the range of 0 to 1 and z is in the range of 1.2 to 5.5). Preferred are burned lithium-containing transition metal oxides, and further lithium-containing transition metal oxides of which inherent crystal structure has been changed by chemically or electrochemically introducing lithium into the burned lithium-containing transition metal oxides are preferred.

Binders, electrically conductive agents, and/or filers may be added to the above active material to prepare a mixture for forming the negative or positive electrode.

Examples of the electrically conductive agents include natural graphite (e.g., flaky graphite, flake graphite and amorphous graphite), artificial graphite, acetylene black, furnace black, ketjen black, carbon fiber, metal powder (e.g., Cu, Ni, Al or Ag (Japanese Patent Provisional Publication No. 63(1988)-148554)), metal fiber and polyphenylene derivatives (Japanese Patent Provisional Publication No. 59(1984)-20971). The agents may be used singly or in combination. The graphite and acetylene black are preferably used in combination. The amount of the agent preferably is in the range of 1 to 50 weight %, and more preferably is in the range of 2 to 30 weight %. In use of carbon black or graphite, the amount preferably is in the range of 2 to 15 weight %.

Examples of binders include natural polysaccharide, synthesized polysaccharide, thermoplastic polymers and polymers having rubber elasticity. Preferred examples include starch, polyvinyl alcohol, carboxymethyl cellulose, diacetyl cellulose, hydroxylpropyl cellulose, regenerated cellulose, polyvinyl chloride, polyvinylpyrrolidone, polytetrafluoroethylene, polyfluorovinylidene, polyethylene, polypropylene, copolymer of ethylene-propylene-diene monomer (EPDM), polymer of sulfonated EPDM, styrene-butadiene rubber, polybutadiene, fluororubber and polyethylene oxide. The polymers may be used singly or in combination. If a polymer such as polysaccharide having a functional group that reacts with lithium is employed, it is preferred that the functional group is inactivated by reacting the group with a compound such as isocyanate compound. The amount of the polymer preferably is in the range of 1 to 50 weight %, and more preferably is in the range of 2 to 30 weight %.

Examples of the filers employable for the invention include fibers of olefin polymers such as polypropylene and polyethylene, glass and carbon. The amount of the filer preferably is in the range of 0 to 30 weight %.

A ratio of capacities of the positive electrode and the negative electrode ((C/A)=capacity of positive electrode (mA)/that of negative electrode (mA)) generally is in the range of 0.5 to 5, preferably in the range of 1 to 4, and more preferably in the range of 1.5 to 3.5.

Examples of materials of a collector for the positive electrode include aluminum, stainless steel, nickel, titanium or an alloy thereof. Examples of materials of a collector for the negative electrode include copper, nickel, titanium, stainless steel or an alloy thereof.

In the invention, the electrolyte is a nonaqueous electrolyte which comprises a solvent containing at least one aprotic organic solvent, and one or more lithium salts (comprising anion and lithium cation) which are soluble in the solvent.

Examples of the aprotic organic solvent include propylene carbonate, ethylene carbonate, γ-butyrolactone, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, ethylmonoglyme, phosphoric acid triester (Japanese Patent Provisional Publication No. 60(1985)-23973), trimethoxymethane (Japanese Patent Provisional Publication No. 61(1986)-4170), dioxolan derivatives (Japanese Patent Provisional Publication Nos. 62(1987)-15771 and 62(1987)-22372 and 62(1988)-108473), sulfolane (Japanese Patent Provisional Publication No. 62(1987)-31959), 3-methyl-2-oxazolidinone (Japanese Patent Provisional Publication No. 62(1987)-44961), propylene carbonate derivatives (Japanese Patent Provisional Publication Nos. 62(1987)-290069 and 62(1987)-290071), tetrahydrofuran derivatives (Japanese Patent Provisional Publication No. 63(1988)-32872), ethyl ether (Japanese Patent Provisional Publication No. 63(1988)-62166) and 1,3-propanesultone (Japanese Patent Provisional Publication No. 63(1988)-102173).

Examples of the lithium salt include: salts of $ClO_4^-$, $BF_4^-$, $PF_6^-$, $CF_3SO_3^-$, $CF_3CO_2^-$, $AsF_6^-$, $SbF_6^-$, $B_{10}Cl_{10}^-$ (Japanese Patent Provisional Publication No. 57(1982)-74974) and $(1,2\text{-dimethoxyethane})_2ClO_4^-$ (Japanese Patent Provisional Publication No. 57(1982)-74977); lower aliphatic carboxylic acids (Japanese Patent Provisional Publication No. 60(1985)-41773); $AlCl_4^-$, $Cl^-$, $Br^-$ and $I^-$ (Japanese Patent Provisional Publication No. 60(1985)-247265); chloroborane (Japanese Patent Provisional Publication No. 61(1986)-165957); and tetraphenylborate (Japanese Patent Provisional Publication No. 61(1986)-214376).

A preferred example of the electrolyte is an electrolytic solution prepared by dissolving $LiCF_3SO_3$, $LiClO_4$, $LiBF_4$ and/or $LiPF_6$ (preferably $LiBF_4$, $LiPF_6$ and/or $LiCF_3SO_3$) in a mixture of propylene carbonate or ethylene carbonate and 1,2-dimethoxyethane and/or diethylcarbonate. An electrolytic solution prepared by dissolving $LiBF_4$ in a mixture of propylene carbonate and 1,2-dimethoxyethane or by dissolving $LiPF_6$ in a mixture of ethylene carbonate and diethylcarbonate.

The concentration of lithium salt preferably is in the range of 0.2 to 3 mole per an electrolytic solution (electrolyte) of 1 liter. A water content contained in the electrolytic solution generally is not more than 500 ppm, preferably not more than 50 ppm and more preferably not more than 20 ppm.

A ratio of the amount of the electrolytic solution to the total amount of the active materials of the positive and negative electrodes, preferably is 0.05 to 10 and more preferably in the range of 0.1 to 0.6.

In combination with the organic electrolyte (electrolytic solution), solid electrolytes described below are also employable.

Solid electrolytes can be classified into inorganic solid electrolytes and organic solid electrolytes.

As the inorganic solid electrolytes, lithium nitride, lithium halide and oxyacidic salts of lithium can be mentioned. Examples of the inorganic solid electrolytes preferably employable for the invention include $Li_3N$, LiI, $Li_5NI_2$, $Li_3N$-LiI-LiOH, $LiSiO_4$, $LiSiO_4$-LiI-LiOH (Japanese Patent Provisional Publication No. 49(1974)-81899), $xLi_3PO_4$-(1- x)Li$_4$SiO$_4$ (Japanese Patent Provisional Publication No. 59(1984)-60866), Li$_2$SiS$_3$ (Japanese Patent Provisional Publication No. 60(1985)-501731) and phosphorus sulfide compounds (Japanese Patent Provisional Publication No. 62(1987)-82665).

Examples of the organic solid electrolytes employable for the invention include: polyethylene oxide derivatives and polymers containing said derivatives (Japanese Patent Provisional Publication No. 63(1988)-135447); polypropylene oxide derivatives and polymers containing said derivatives; polymers containing ion-dissociating groups (Japanese Patent Provisional Publication Nos. 62(1987)-254302, 62(1987)-254303 and 63(1988)-193954); a mixture of polymers containing ion-dissociating groups and the above-mentioned aprotic electrolytic solutions (U.S. Pat. Nos. 4,792,504 and 4,830,939, Japanese Patent Provisional Publication Nos. 62(1987)-22375, 62(1987)-22376, 63(1988)-22375, 63(1988)-22776 and 1(1989)-95117); phosphoric acid ester polymer (Japanese Patent Provisional Publication No. 61(1986)-256573); and polymer matrix material containing aprotic polar solvent (U.S. Pat. Nos. 4,822, 70 and 4,830,939, Japanese Patent Provisional Publication No. 63(1988)-239779, Japanese Patent Application Nos. 2(1990)-30318 and 2(1990)-78531).

In addition to the above solid electrolytes, an electrolytic solution containing polyacrylonitrile (Japanese Patent Provisional Publication No. 62(1987)-278774) may be also employed. Further, inorganic and organic solid electrolytes may be used in combination (Japanese Patent Provisional Publication No. 60(1985)-1768).

The other compounds may be added into the electrolytic solution in order to improve discharge characteristics and characteristics in charge-discharge cycle. Examples of the compounds include pyridine (Japanese Patent Provisional Publication No. 49(1974)-108525), triethylphosphite (Japanese Patent Provisional Publication No. 47(1972)-4376), triethanolamine (Japanese Patent Provisional Publication No. 52(1977)-72425), cyclic ethers (Japanese Patent Provisional Publication No. 57(1982)-152684), ethylene diamine (Japanese Patent Provisional Publication No. 58(1983)-87777), n-glyme (Japanese Patent Provisional Publication No. 58(1983)-87778), hexaphosphoric acid triamide (Japanese Patent Provisional Publication No. 58(1983)-87779), nitrobenzene derivatives (Japanese Patent Provisional Publication No. 58(1983)-214281), sulfur (Japanese Patent Provisional Publication No. 59(1984)-8280), quinoneimine dye (Japanese Patent Provisional Publication No. 59(1984)-68184), N-substituted oxazolidinone and N,N'-substituted imidazolidinone (Japanese Patent Provisional Publication No. 59(1984)-154778), ethylene glycol dialkyl ether (Japanese Patent Provisional Publication No. 59(1984)-205167), quaternary ammonium salts (Japanese Patent Provisional Publication No. 60(1985)-30065), polyethylene glycol (Japanese Patent Provisional Publication No. 60(1985)-41773), pyrrole (Japanese Patent Provisional Publication No. 60(1985)-79677), 2-methoxyethanol (Japanese Patent Provisional Publication No. 60(1985)-89075), AlCl$_3$ (Japanese Patent Provisional Publication No. 61(1986)-88466), monomer of the conductive polymer used as the active material (Japanese Patent Provisional Publication No. 61(1986)-161673), triethylenephosphoramide (Japanese Patent Provisional Publication No. 61(1986)-208758), trialkylphosphine (Japanese Patent Provisional Publication No. 62(1987)-80976), morpholine (Japanese Patent Provisional Publication No. 62(1987)-80977), aryl compounds having carbonyl group (Japanese Patent Provisional Publication No. 62(1987)-86673), crown ethers such as 12-crown-4 (*Physical Review* B, vol. 42(1990) pp. 6424), hexamethylphosphoric triamide and 4-alkylmorpholine (Japanese Patent Provisional Publication No. 62(1987)-217575), bicyclic tertiary amine (Japanese Patent Provisional Publication No. 62(1987)-217578), oils (Japanese Patent Provisional Publication No. 62(1987)-287580), quaternary phosphonium salts (Japanese Patent Provisional Publication No. 63(1988)-121268) and tertiary sulfonium salts (Japanese Patent Provisional Publication No. 63(1988)-121269).

In order to render the electrolytic solution noncombustible, halogen-containing solvents such as carbon tetrachloride and ethylene chloride trifluoride may be added (Japanese Patent Provisional Publication No. 48(1972)-36632). Further, carbon dioxide may be contained in the electrolytic solution so as to give improved preservability at high temperatures (Japanese Patent Provisional Publication No. 59(1984)-134567).

Of the nonaqueous batteries of the invention, the process for preparation of the nonaqueous secondary battery is explained. The process is, for example, performed in the following manner A method for preparation of the mixture for forming the negative electrode is, for example, carried out by mixing an active material of the negative electrode (e.g., the lithium-containing transition metal oxide), electrolyte, a binder (which are in the form of powder) and a solvent such as an organic solvent or water. The mixing may be performed in dry process with employing no solvent. Previously, the binder may be converted into its solution or its dispersion (e.g., latex). The mixture for forming the positive electrode layer is also prepared in the same manner as above.

Examples of mixing machines preferably employable for the preparation include mortar, mixer, homogenizer, dissolver, sand mill, paint shaker, kneader and dynomill.

The mixture for negative or positive electrode generally is coated on both side of the collector, dried, and compressed to prepare a negative electrode sheet. As the coating method, there can be generally employed reverse roller coating, direct roller coating, blade coating, knife coating, extrusion coating, curtain coating, gravure coating, bar coating, dip coating and squeeze coating. Preferred are blade coating, knife coating and extrusion coating. The coating is preferably carried out at a rate of 0.1 to 100 m/min. By selecting a coating method suitable for properties (with respect to solution and drying) of the negative electrode from the above coating methods, a coated layer having uniform surface can be formed.

As the drying methods, there can be employed known methods. Preferred methods include those using hot air, vacuum, infrared rays, far-infrared rays, electron beam and dry air.

As the pressing methods for compressing the electrode sheet, there can be employed known methods. Preferred are a mold press method and a calendering method. Pressure for pressing preferably is in the range of 0.2 to 3 t/cm$^2$. Pressing rate of the calendering method preferably is in the range of 0.1 to 50 m/min and pressing temperature preferably is in the range of 20° to 200° C. After completion of the pressing, the electrode sheet may be allowed to pass through a number of rollers having a diameter of 10 to 50 mm to form fine cracks on its surface.

The collector may be physically or chemically treated to have an unevenness surface in order to increase a bonding strength to the active material of negative or positive electrode. The unevenness may be previously formed by means of anodizing, electrolysis, sandblasting or rolling for formation of rough surface. Otherwise, after the mixture for negative or positive electrode is coated, the unevenness may be formed by the above pressing. A size (height) of the unevenness generally is 1 to 10 μm.

The electrode sheet is usually cut the sheet in a desired shape to be employed. A width of the cut sheet preferably is in the range of 0.2 to 5 mm, and more preferably in the range of 0.5 to 4 mm. In the range, the width of the negative electrode sheet preferably is more than that of the positive electrode sheet. The cutting can be performed according to known cutting methods.

The electrode sheet may be subjected to a dehydration treatment at a temperature 20° to 350° C. (preferably 100° to 250° C.) if desired. As methods of performing the dehydration treatment, there can be employed known methods. Preferred methods include those using hot air, hot dried air, vacuum, infrared rays, far-infrared rays, electron beam and dry air.

The moisture content in the whole battery preferably is not more than 2,000 ppm. The moisture content in the electrode sheet preferably is not more than 500 ppm, and more preferably in the range of 200 ppm.

The negative electrode sheet may be charged in the form of sheet, if desired.

A lead tab is provided on the electrode sheet, if desired. Examples of materials of the lead tab for the positive electrode include aluminum, stainless steel, nickel, titanium or an alloy thereof. Examples of materials of the lead tab for the negative electrode include copper, nickel, titanium, stainless steel or an alloy thereof. The lead tab has usually a shape of ribbon. The lead tab for the positive electrode is generally attached to the most inside portion of the wound electrode sheet, while the lead tab for the negative electrode is generally attached to the most outside portion of the wound electrode sheet (described later). The lead tab may be covered with an insulating tape.

A separator provided between the negative and the positive electrode sheets is an insulated film having both high ion permeability and desired mechanical strength. A generally used separator is a porous sheet or non-woven fabric made of olefinic polymers such as polypropylene, or a sheet of glass fiber or polyethylene, because they have hydrophobic property and resistance of organic solvent. The thickness of the separator generally is in the range of 5 to 300 μm.

A core for winding may be employed, if desired. As materials of the core for winding, known materials are employable.

A method of winding the sheet (e.g., around the core) can be performed according to a known method utilizing in winding of a condenser for electrolysis. An outside electrode sheet, a separator, an inside electrode sheet and a separator are superposed in order, and they (composite) are wound around the core for winding.

The shape of the wound electrode sheet (composite) may be circular cylinder having a section view close to circle or having a section view of long circle. The battery shown in FIG. 1 or 2 and Example (described later) use an wound electrode which has a shape of circular cylinder having a section view close to circle. For example, the wound electrode sheet having long circular cylinder can be prepared in the following manner. A core having a diameter ⅓ to ⅔ times that of the wound electrode is prepared, an electrode sheet is wound around the core, the core is pulled off, and the wound electrode sheet is deformed by application of force to prepare one of long circular cylinder. Otherwise, an electrode sheet is wound around a core of rectangular plate to prepare the wound electrode of long circular cylinder. The obtained wound electrode of long circular cylinder is incorporated in a battery can in the form of long circular cylinder, and a long circular gasket and opening sealing plate are superposed the on the upper of the battery can. Subsequently, they are crimped so as to seal the opening area.

As a stopper for fastening the edge of the wound sheet, known stopping tapes are employable. Instead of the stopper, a separator may be further wound 1 to 5 times around the wound electrode to fasten its circumference through thermal welding by the use of an ultrasonic sealer or heater.

The above wound sheet (composite) is inserted in a battery can. As materials of the battery can, nickel-plated iron plate, stainless steel (e.g., SUS304, SUS304L, SUS304N, SUS316, SUS316L, SUS430 and SUS444), nickel-plated stainless steel, aluminum, its alloy, nickel, copper and titanium are employable. The battery can has a shape of a circular cylinder, long circular cylinder or rectangular prism having a bottom. A thickness of the battery can generally is in the range of 100 to 500 μm. To increase an inner volume of the battery can, the thickness may be made to 50 to 150 μm. In this case, it is preferred that a portion in the vicinity of the bottom is made to a curved surface or to have a thickness of 300 to 500 μm in order to prevent deformation of the battery due to increase of the inner pressure. To increase the strength of the battery can having the thinner thickness, a stainless steel, a carbon steel or a titanium alloy is preferably used as its material. Particularly, a super plasticized stainless steel is preferably used to further reduce the thickness.

An insulating plate is arranged between the wound electrode sheet and the bottom or cap of the battery can, if desired.

Insertion of the composite of negative and positive electrode sheets and the separators (the wound electrode sheet) into the battery can is, for example, performed in the following manner. The wound electrode sheet having the attached stopping tape, may be inserted in the battery can, or it may be inserted after removing the stooping tape. Further, the wound electrode sheet may be inserted into the battery can which has a diameter by 50 to 500 μm lager than a predetermined diameter, and the battery can may be compressed in an appropriate step to return its diameter to the predetermined diameter.

The battery can into which the wound electrode sheet is inserted, may be made less in a diameter of the portion close to the upper opening portion, whereby the cap and a gasket can be easily supported. The portion having the less diameter is referred to as bead.

For example, when the collector for the positive electrode is made of aluminum, the lead tab is also preferably made of aluminum. In this case, it is preferred that the lower plate of the cap combined with a positive terminal is made of aluminum or of a steel plate having aluminum on its inside surface because they can be easily welded. In the case that the lower plate of the cap is made of stainless steel such as SUS316 type or SUS317 type for the purpose of improvement in strength or corrosion resistance, it is difficult to perform resistance-welding of the opening sealing plate of a stainless steel and the lead tab of aluminum. Therefore, it is preferred that a piece of stainless steel is attached to the point of the lead tab facing the lower plate of the cap or their welding is conducted by the use of ultrasonic welding.

Examples of materials of the gasket include polyethylene, polypropylene and polyamide such as nylon.

Examples of materials of the cap (comprising the upper and lower plates) include stainless steel, aluminum, its alloys, titanium, its alloys, nickel, its alloys, copper, its alloys, monel metal, Inconel, Hastelloy and nickel-plated iron.

A sealing compound may be coated on an area close to an opening of the battery can and/or on a gasket.

Handling for winding the separator, the electrodes, the collector and the stopper (tape) may be performed by detecting the tension value by the use of the dancing roller and a tension pick-up and absorbing the fluctuation to control a winding torque and the number of revolutions. Further, to prevent deviation of the location in the width direction from occurring, a roller provided with a flange, a sensor for detecting a location or a roller for correcting a location in the width direction may be employed. In the detection of deviation in the width direction, there are two methods of detecting a center of the width and detecting an edge of the width. The roller for correcting a location generally has a one or two roller capable of changing an angle with an axis almost corresponding to a center of the roller and thus the correction is conducted by changing the angle of the roller to the direction that the deviation is reduced. Otherwise, two or more of the rollers may be allowed to come into contact with the sheet (e.g., electrode sheet) and may be moved parallel with the direction that the deviation is reduced on the contact.

Measurement of a leak current or insulation may be conducted after winding of the electrode sheet, after welding of the can bottom, and/or after beading or coating of the sealing compound. The leak current is obtained, for example, by applying a direct or alternating voltage of 1 to 10 volts between lead tabs or terminals of the positive electrode and the negative electrode to measure the flowing current by 1 picoampere or 0.001 picoampere. In the measurement, for example, Quasistatic CV Meter Model 595 (available from Keysray Co. Ltd.). Further, the insulation is obtained, for example, applying a direct or alternating voltage of 100 to 5,000 volts between lead tabs or terminals of the positive electrode and the negative electrode to observe existence of a spark current. In this measurement, for example, Pin-hole tester TR-D type (available from Sanko Electronic Co. Ltd.). The leak current preferably is less than 1 picoampere when the voltage of 10 volts is applied, while the insulation preferably is such an extent that no spark occurs in 1,000 volts or less.

Subsequently, the electrolytic solution is injected into the can, and then the can is sealed up with a sealing plate to prepare the battery of the invention. Insertion of the electrolytic solution may be carried out in one step. However, the insertion is preferably made in two or more steps. In insertion by two or more steps, electrolytic solutions to be inserted in each step may have the same composition or a different composition from each other. For example, after a nonaqueous solvent or an electrolytic solution prepared by dissolving lithium salt in a nonaqueous solvent is inserted, a nonaqueous solvent or an electrolytic solution which has viscosity higher than that of the initial solvent or solution. Further, to shorten time for insertion, the insertion may be performed with reducing pressure within a can (preferably 500 to 1 torr, more preferably 400 to 10 torr), or with imparting supersonic wave or centrifugal force to the can.

Sealing of the opening of the battery is, for example, performed below.

The sealing plate and the upper plate of the cap combined with positive or negative terminal are attached to the lower plate of the cap, as shown FIG. 1 or 2. The lower plate of the cap is arranged on an upper opening portion of the battery can combined with positive or negative terminal through a gasket, and the upper portion of the cap is pressed to deform the cap (caulking method). Thus, a cylindrical battery is sealed. Otherwise, a method employing hermetic seal may be adopted.

The battery may be squeezed to render its diameter less if desired, for examples after sealing.

Elements (e.g., collector, electrode sheet) constituting the battery may be washed or dried if desired.

As the elements, those having tolerance of size, cylindrical degree, true circular degree, right-angle degree or parallel degree that is in the desired range, may be employed.

The sealed battery may be washed or dried if desired. The battery may be subjected to post treatment such as heat treatment, charging or discharging. The battery may be covered with covering material if desired. The battery is packed in a one to plural set if desired.

The battery is charged singly or plurally.

The nonaqueous secondary battery of the invention can be utilized in various uses, for example, note-sized personal computers for color or white-and-black, personal computer capable of inputting with pen, pocket-sized personal computer, note-sized word-processor, pocket-sized word-processor, portable CD player, portable telephone, telephone having no cord, paging equipment, compact terminal equipment, portable facsimile, portable copying machine, portable printer, pocket-sized stereo for headphones, video camera, liquid crystal display, compact cleaner, electric shaver, telephone for car, transceiver for electric power of a small capacity, electric tool, electronic calculator, card-shaped memory, watch, camera and hearing aid.

The safety valve comprising the sealing metal plate having the layer of polymer material of the invention may be employed for an alkaline battery, a nickel-cadmium battery, a nickel-hydrogen battery and a lead storage battery.

As materials of the elements constituting the battery of the invention other than the polymer material, those described in Japanese Patent Application No. 5(1993)-114931 can be employed, and as to methods for preparation of the battery, those described in the Application can be also utilized.

The following examples further illustrate the present invention, but these examples by no means restrict the invention.

EXAMPLE 1

A mixture for positive electrode was prepared by mixing of $LiCoO_2$ (87 wt. %) as an active material of positive electrode, acetylene black (10 wt. %) as a conductive agent, and a N-methylpyrrolidone solution of polyfluorovinylidene as binder (3 wt. % in solid). The obtained mixture was coated on the both side of a collector of Al foil having a thickness of 20 μm and dried to prepare a composite of the collector and the positive electrode thereon. The composite was molded under compression using a roller press and cut to prepare the negative electrode sheet in the form of band. The sheet had a thickness of 250 μm.

A mixture for negative electrode was prepared by mixing of $LiVCoO_4$ (87 wt. %) as an active material of negative electrode, acetylene black (9 wt. %) as a conductive agent, and a N-methylpyrrolidone solution of polyfluorovinylidene as binder (4 wt. % in solid). The obtained mixture was coated on the both side of a collector of Cu foil having a thickness of 20 μm and dried to prepare a composite of the collector and the negative electrode thereon. The composite was molded under compression using a roller press and cut to prepare the negative electrode sheet in the form of band. The sheet had a thickness of 150 μm.

A separator of porous propylene film, the negative electrode sheet, a separator of porous propylene film and the positive electrode sheet were superposed in order and spirally wound to form a wound composite. The wound composite was incorporated in a cylindrical battery can having a nickel-plated iron bottom that serves as a terminal of the negative electrode. 1 mole/L electrolytic solution prepared by dissolving $LiPF_6$ in a solvent which was prepared by mixing of 50 volume parts of ethylene carbonate and 50 volume parts of diethylene carbonate was injected into the battery can. A sealing plate and a upper plate of a cap combined with positive terminal were attached to a lower plate of a cap made of SUS317L, as shown FIG. 1. The lower plate of the cap was fixed on an upper opening portion of the battery can through a gasket by caulking. Previously, the terminal of the positive electrode had been connected to the positive electrode sheet using a lead tab and the battery can had been previously connected to the negative electrode sheet by the use of a lead tab in the inside of the battery. Thus, a cylindrical battery as shown in FIG. 1 was prepared.

The above cap provided with the sealing plate (cap consisting the lower plate of the cap, the sealing plate and the upper plate of the cap) was prepared in the following manner. A graft copolymer obtained by grafting maleic anhydride (1 weight part based on the copolymer described below) to a copolymer of ethylene and ethyl acrylate (ethylene/ethyl acrylate=77/23, by weight; the above-mentioned compound No. (1)-3), was dissolved in toluene to prepare a coating solution having a solid concentration of 10 weight %. The graft polymer is available from Mistui Du Pont Polychemical Co., Ltd. in the trade name of "AR201". The coating solution was coated on the outside area of the lower plate of the cap (the side in the contact with the sealing metal plate 7 of FIG. 1) in the coated amount of 250 g/m$^2$ in the form of doughnut. The above coating was performed by spraying the coating solution using a needle nozzle having a rectangular aperture on the lower plate of the cap which was horizontally rotating at 600 rpm, the coating solution being fed to the needle nozzle by the use of a tube-wiping pump. After the coating, the coated solution was dried using the wind having a rate 3 m/sec. and a temperature of 30° C. and thereafter the wind having a rate 1 m/sec. and a temperature of 60° C. to form a layer of polymer material having a thickness of approx. 20 μm.

Subsequently, an aluminum foil (*1N30-O) having a thickness of 70 μm was punched to prepare the circular foil (sealing metal plate). The circular foil was placed on the layer of polymer material formed on the lower plate of the cap in such a manner that the circular foil is in contact with the layer side of the lower plate of the cap, and fixed by heat sealing using a heat sealer. The heat sealing was performed by pressing the circular foil using a cullet rubber sheet and heating the lower plate of the cap, in the conditions of a temperature of 200° C., a pressure of 20 kgw/cm$^2$, a heating time period of 2 seconds and a cooling time period of 3 seconds.

*1N30-O: "1N30" means the kind of material represented by International Aluminum Alloy Symbol, and "O" represents the nature of aluminum material.

EXAMPLE 2

The procedures of Example 1 were repeated except for employing as the graft polymer one obtained by grafting maleic anhydride (4 weight part based on the copolymer described below) to a copolymer of propylene and ethyl acrylate (propylene/ethyl acrylate=80/20, by weight; the above-mentioned compound No. (1)-1) to prepare a cylindrical battery.

EXAMPLE 3

The procedures of Example 1 were repeated except for employing as the graft polymer one obtained by grafting maleic anhydride (4 weight part based on the copolymer described below) to a copolymer of butylene and methyl acrylate (butylene/methyl acrylate=60/40, by weight; the above-mentioned compound No. (1)-6) to prepare a cylindrical battery.

EXAMPLE 4

The procedures of Example 1 were repeated except for employing as the graft polymer one obtained by grafting maleic anhydride (5 weight part based on the copolymer described below) to a copolymer of ethylene and benzyl methacrylate (ethylene/benzyl methacrylate=95/5, by weight; the above-mentioned compound No. (1)-5) to prepare a cylindrical battery.

EXAMPLE 5

The procedures of Example 1 were repeated except for employing as the graft polymer one obtained by grafting maleic anhydride (0.2 weight part based on the copolymer described below) to a copolymer of ethylene and isobutyl methacrylate (ethylene/isobutyl methacrylate=70/30, by weight; above-mentioned compound No. (1)-10) to prepare a cylindrical battery.

EXAMPLE 6

The procedures of Example 1 were repeated except for preparing the cap provided with the sealing plate in the following manner to prepare a cylindrical battery.

The above cap provided with the sealing plate was prepared in the following manner. A graft copolymer obtained by grafting maleic anhydride (1 weight part based on the copolymer described below) to a copolymer of ethylene and ethyl acrylate (ethylene/ethyl acrylate=77/23, by weight) (the above-mentioned compound No. (1)-3, "AR201" available from Mistui Du Pont Polychemical Co., Ltd.), was dissolved in toluene to prepare a coating solution having a solid concentration of 10 weight %. The solution was coated on a whole surface of an aluminum foil (1N30-0) having a thickness of 70 μm in the coated amount of 200 g/m$^2$ using an extrusion-type nozzle, and the coated layer was dried using the wind having a rate 1 m/sec. and a temperature of 60° C. to form a layer of polymer material having a thickness of approx. 20 μm.

Subsequently, an aluminum foil having the layer of polymer material was punched to prepare the circular foil (sealing plate). The circular foil was placed on the lower plate of the cap (10 in FIG. 1) in such a manner that the layer side of the circular foil is in contact with the lower plate of the cap, and fixed by heat sealing using a heat sealer. The heat sealing was performed by pressing the circular foil using a cullet rubber sheet and heating the lower plate of the cap in the conditions of a temperature of 160° C., a pressure of 20 kgw/cm$^2$, a heating time period of 30 seconds and a cooling time period of 30 seconds.

EXAMPLE 7

The procedures of Example 6 were repeated except for employing as the graft copolymer one obtained by grafting maleic anhydride (4 weight part based on the copolymer described below) to a copolymer of propylene and ethyl acrylate (propylene/ethyl acrylate=80/20, by weight; the above-mentioned compound No. (1)-1) to prepare a cylindrical battery.

EXAMPLE 8

The procedures of Example 6 were repeated except for employing as the graft copolymer one obtained by grafting maleic anhydride (4 weight part based on the copolymer described below) to a copolymer of butylene and methyl acrylate (butylene/methyl acrylate=60/40, by weight; the above-mentioned compound No. (1)-6) to prepare a cylindrical battery.

EXAMPLE 9

The procedures of Example 6 were repeated except for employing as the graft copolymer one obtained by grafting maleic anhydride (5 weight part based on the copolymer described below) to a copolymer of ethylene and benzyl methacrylate (ethylene/benzyl methacrylate=95/5, by weight; the above-mentioned compound No. (1)-5) to prepare a cylindrical battery.

EXAMPLE 10

The procedures of Example 1 were repeated except for employing as the graft copolymer one obtained by grafting maleic anhydride (0.2 weight part based on the copolymer described below) to a copolymer of ethylene and isobutyl methacrylate (ethylene/isobutyl methacrylate=70/30, by weight; above-mentioned compound No. (1)-10) to prepare a cylindrical battery.

EXAMPLE 11

The procedures of Example 1 were repeated except for preparing the can provided with the sealing plate in the following manner to prepare a cylindrical battery.

The above can provided with the sealing plate was prepared in the following manner. A water-dispersion of a copolymer of ethylene and methacrylic acid (ethylene/methacrylic acid=95/5, by weight; the above-mentioned compound No. (3)-2) having a solid concentration of 30 weight %, was coated on a whole surface of an aluminum foil (1N30-0) having a thickness of 70 µm in the coated amount of 70 g/m$^2$ using an extrusion-type nozzle, and the coated layer was dried using the wind having a rate 1 m/sec. and a temperature of 120° C. to form a layer of polymer material having a thickness of approx. 20 µm. The copolymer is available from Mistui Petrochemical Industries, Ltd. in the trade name of "Chemiperl S-100".

Subsequently, an aluminum foil having the layer of polymer material was punched to prepare the circular foil (sealing plate). The circular foil was placed on the lower plate of the can (10 in FIG. 2) in such a manner that the polymer layer side of the circular foil is in contact with the lower plate of the can, and fixed by heat sealing using a heat sealer. The heat sealing was performed by pressing the circular foil using a cullet rubber sheet and heating the lower plate of the can in the conditions of a temperature of 200° C., a pressure of 20 kgw/cm$^2$, a heating time period of 2 seconds and a cooling time period of 3 seconds.

EXAMPLE 12

The procedures of Example 11 were repeated except for employing as the copolymer a copolymer of ethylene and acrylic acid (ethylene/acrylic acid=92/8, by weight; the above-mentioned compound No. (3)-1) to prepare a cylindrical battery.

EXAMPLE 13

The procedures of Example 11 were repeated except for employing as the copolymer a copolymer of propylene and acrylic acid (propylene/acrylic acid=85/15; by weight; the above-mentioned compound No. (3)-3) to prepare a cylindrical battery.

EXAMPLE 14

The procedures of Example 11 were repeated except for employing as the copolymer a copolymer of propylene and methacrylic acid (propylene/methacrylic acid=97/3, by weight; the above-mentioned compound No. (3)-4) to prepare a cylindrical battery.

EXAMPLE 15

The procedures of Example 11 were repeated except for employing as the copolymer a copolymer of butylene and acrylic acid (butylene/acrylic acid=75/25, by weight; the above-mentioned compound No. (3)-5) to prepare a cylindrical battery.

EXAMPLE 16

The procedures of Example 1 were repeated except for preparing the can provided with the sealing plate in the following manner to prepare a cylindrical battery.

A graft copolymer obtained by grafting γ-methacryloxypropyltrimethoxysilane (1 weight part based on the copolymer described below) to a copolymer of ethylene and ethyl acrylate (ethylene/ethyl acrylate=90/10, by weight) (the above-mentioned compound No. (2)-3), was dissolved in toluene to prepare a coating solution having a solid concentration of 10 weight %. The graft copolymer is available from Mistui Du Pont Polychemical Co., Ltd. in the trade name of "AS-251". The coating solution was coated on the outside area of the lower plate of the can (the side in the contact with the sealing metal plate 7 of FIG. 1) in the coated amount of 250 g/m$^2$ in the form of doughnut. The above coating was performed by spraying the coating solution using a needle nozzle having a rectangular aperture on the lower plate of the can which was horizontally rotating at 600 rpm, the coating solution being fed to the needle nozzle by the use of a liquid surface gas-pressing dispenser having a valve at its point (which was controlled at a temperature of 50° C. by a jacket for heating). After the coating, the coated solution was dried using the wind having a rate 1 m/sec. and a temperature of 60° C. to form a polymer layer having a thickness of approx. 20 µm.

Subsequently, an aluminum foil (1N30-O) having a thickness of 70 µm was punched to prepare the circular foil (sealing metal plate). The circular foil was placed on the layer of polymer material formed on the lower plate of the can in such a manner that the circular foil is in contact with the layer side of the lower plate of the can, and fixed by heat sealing using a heat sealer. The heat sealing was performed by pressing the circular foil using a cullet rubber sheet and heating the lower plate of the can, in the conditions of a temperature of 200° C., a pressure of 16 kgw/cm$^2$, and a heating time period of 90 seconds. Then, on the sealing plate, a ring 11 (in FIG. 2) and a upper plate of a cap 8 were superposed in order, and the rising portion (the side opposite of the opening) of the periphery of the lower plate of the can was crimped to integrate the lower plate of the can 10, the ring 11, the sealing plate 7 and the upper plate of the cap 8 to one unity. Further the unity was heated at 160° C. for 10 minutes.

EXAMPLE 17

The procedures of Example 16 were repeated except for employing as the graft copolymer one obtained by grafting vinylacetoxysilane (2 weight part based on the copolymer described below) to a copolymer of propylene and ethyl acrylate (propylene/ethyl acrylate=80/20, by weight; the above-mentioned compound No. (2)-1) to prepare a cylindrical battery.

EXAMPLE 18

The procedures of Example 16 were repeated except for employing as the graft copolymer one obtained by grafting acryloxymethyltriethoxysilane (3 weight part based on the copolymer described below) to a copolymer of butylene and ethyl acrylate (butylene/ethyl acrylate=60/40, by weight; the above-mentioned compound No. (2)-6) to prepare a cylindrical battery.

EXAMPLE 19

The procedures of Example 16 were repeated except for employing as the graft copolymer one obtained by grafting vinyltriethoxysilane (0.1 weight part based on the copolymer described below) to a copolymer of ethylene and benzyl methacrylate (ethylene/benzyl methacrylate=95/5, by weight; the above-mentioned compound No. (2)-5) to prepare a cylindrical battery.

EXAMPLE 20

The procedures of Example 16 were repeated except for employing as the graft copolymer one obtained by grafting N-β-(N-vinylbenzylaminoethyl)-γ-aminopropylmethoxysilane (1 weight part based on the copolymer described below) to a copolymer of ethylene and isobutyl methacrylate (ethylene/isobutyl methacrylate=70/30, by weight; the above-mentioned compound No. (2)-10) to prepare a cylindrical battery.

EXAMPLE 21

The procedures of Example 6 were repeated except for employing as the graft copolymer one obtained by grafting γ-methacryloxypropyltrimethoxysilane (1 weight part based on the copolymer described below) to a copolymer of ethylene and ethyl acrylate (ethylene/ethyl acrylate=90/10, by weight) (the above-mentioned compound No. (2)-3, "AS-251" available from Mistui Du Pont Polychemical Co., Ltd.), to prepare a cylindrical battery.

EXAMPLE 22

The procedures of Example 6 were repeated except for employing as the graft copolymer one obtained by grafting vinylacetoxysilane (2 weight part based on the copolymer described below) to a copolymer of propylene and ethyl acrylate (propylene/ethyl acrylate=80/20, by weight; the above-mentioned compound No. (2)-1) to prepare a cylindrical battery.

EXAMPLE 23

The procedures of Example 6 were repeated except for employing as the graft copolymer one obtained by grafting acryloxymethyltriethoxysilane (3 weight part based on the copolymer described below) to a copolymer of butylene and ethyl acrylate (butylene/ethyl acrylate=60/40, by weight; the above-mentioned compound No. (2)-6) to prepare a cylindrical battery.

EXAMPLE 24

The procedures of Example 6 were repeated except for employing as the graft copolymer one obtained by grafting vinyltriethoxysilane (0.1 weight part based on the copolymer described below) to a copolymer of ethylene and benzyl methacrylate (ethylene/benzyl methacrylate=95/5, by weight; the above-mentioned compound No. (2)-5) to prepare a cylindrical battery.

EXAMPLE 25

The procedures of Example 6 were repeated except for employing as the graft copolymer one obtained by grafting N-β-(N-vinylbenzylaminoethyl)-γ-aminopropylmethoxysilane (1 weight part based on the copolymer described below) to a copolymer of ethylene and isobutyl methacrylate (ethylene/isobutyl methacrylate=70/30, by weight; the above-mentioned compound No. (2)-10) to prepare a cylindrical battery.

COMPARISON EXAMPLE 1

The procedures of Example 1 were repeated except for preparing the can provided with the sealing plate in the following manner to prepare a cylindrical battery.

The above can provided with the sealing plate was prepared in the following manner. A film having a thickness of 50 μm obtained by grafting maleic anhydride (5 weight part) to polyethylene, was laminated on an aluminum foil having a thickness of 20 μm by pressing through heating to 180° C. using a heated roller (hot roller), to form a composite of the polymer film and the foil.

Subsequently, the composite was punched to prepare the circular sealing plate. The circular plate was placed on the lower plate of the can (10 in FIG. 1) in such a manner that the polymer film side is in contact with the lower plate of the can, and fixed by heat sealing using a heat sealer. The heat sealing was performed by pressing the circular plate using a rubber sheet and heating the opening sealing plate, in the conditions of a temperature of 200° C., a pressure of 20 kgw/cm$^2$, a heating time period of 2 seconds and a cooling time period of 3 seconds.

COMPARISON EXAMPLE 2

The procedures of Example 1 were repeated except for preparing the can provided with the sealing plate in the following manner to prepare a cylindrical battery.

The above can provided with the sealing plate was prepared in the following manner. A polyethylene film having a thickness of 50 μm was laminated on an aluminum foil having a thickness of 20 μm using an adhesive having electrolytic solution-resistance, to form a composite of the polyethylene film and the foil.

Subsequently, the composite was punched to prepare the circular sealing plate. The circular plate was placed on the lower plate of the can (10 in FIG. 1) in such a manner that the polyethylene film side is in contact with the lower plate of the can, and fixed by heat sealing using a heat sealer in the same manner as Comparison Example 1.

COMPARISON EXAMPLE 3

The procedures of Example 1 were repeated except for preparing the can provided with the sealing plate in the following manner to prepare a cylindrical battery.

The above can provided with the sealing plate was prepared in the following manner. An aluminum foil having a thickness of 70 μm was punched to prepare the circular sealing plate. The circular plate was placed on the lower plate of the can (10 in FIG. 1), and fixed by heat sealing using a heat sealer in the same manner as Comparison Example 1.

As for the batteries of the Examples and Comparison Examples, the can provided with the sealing plate was attached to a dig of an instrument for measuring the amount of gas, and the gas barrier property (steamtightness) of the sealing plate was evaluated in the following manner:

The amount of gas was determined as the amount of steam that was passed through the sealing plate in the conditions of a temperature of 25° C. and a relative humidity of 50%.

Evaluation of these batteries was conducted as follows:

Good: the amount of passed steam is not more than 1,000 nanogram/hour.

Bad: the amount of passed steam is more than 1,000 nanogram/hour.

The results are set forth in Table 1.

TABLE 1

| Sample No. | Amount of Passed Steam (nanogram/hour) | Evaluation |
| --- | --- | --- |
| Example 1 | <1 | Good |
| Example 2 | <1 | Good |
| Example 3 | <1 | Good |
| Example 4 | <1 | Good |
| Example 5 | <1 | Good |
| Example 6 | <1 | Good |
| Example 7 | <1 | Good |
| Example 8 | <1 | Good |
| Example 9 | <1 | Good |
| Example 10 | <1 | Good |
| Example 11 | <1 | Good |
| Example 12 | <1 | Good |
| Example 13 | <1 | Good |
| Example 14 | <1 | Good |
| Example 15 | <1 | Good |
| Example 16 | <1 | Good |
| Example 17 | <1 | Good |
| Example 18 | <1 | Good |
| Example 19 | <1 | Good |
| Example 20 | <1 | Good |
| Example 21 | <1 | Good |
| Example 22 | <1 | Good |
| Example 23 | <1 | Good |
| Example 24 | <1 | Good |
| Example 25 | <1 | Good |
| Com. Ex. 1 | <1 | Good |
| Com. Ex. 2 | 2–5 | Good |
| Com. Ex. 3 | 1,100–1,800 | Bad |

The battery of Comparison Example 3 showing the above amount of passed steam means increase of water of approx. 0.5 ppm/hour which exceeds 20 ppm per 40 hours (i.e., the upper value of the specification of moisture content in an electrolytic solution). Therefore, the battery is unsuitable for a nonaqueous battery. The batteries other than the battery of Comparison Example 3 are apparently excellent in steamtightness.

Subsequently, as to the batteries of the Examples and Comparison Examples, a pressure that the sealing plate starts working was measured in the following manner:

A hole was punched out in the bottom of each of these batteries. Argon gas was introduced into the inside of the battery to increase its inside pressure, and a pressure that the sealing plate starts working was measured. The measurements were carried out in the conditions of a temperature of −60° C., 25° C. and 80° C.

The results are set forth in Table 2.

TABLE 2

| Sample No. | Pressure to Start Working | | | (Kgw/cm²) Ratio (−60° C./80° C.) |
| --- | --- | --- | --- | --- |
| | −60° C. | 25° C. | 80° C. | |
| Example 1 | 23 | 20 | 17 | 1.35 |
| Example 2 | 22 | 20 | 17 | 1.29 |
| Example 3 | 22 | 20 | 17 | 1.29 |
| Example 4 | 23 | 20 | 17 | 1.35 |
| Example 5 | 23 | 20 | 17 | 1.35 |
| Example 6 | 23 | 20 | 17 | 1.35 |
| Example 7 | 22 | 20 | 17 | 1.29 |
| Example 8 | 22 | 20 | 17 | 1.29 |
| Example 9 | 23 | 20 | 17 | 1.35 |
| Example 10 | 23 | 20 | 17 | 1.35 |
| Example 11 | 22 | 20 | 17 | 1.29 |
| Example 12 | 22 | 20 | 16 | 1.37 |
| Example 13 | 22 | 20 | 16 | 1.37 |
| Example 14 | 23 | 20 | 17 | 1.35 |
| Example 15 | 22 | 20 | 17 | 1.29 |
| Example 16 | 22 | 20 | 17 | 1.29 |
| Example 17 | 22 | 20 | 17 | 1.29 |
| Example 18 | 23 | 20 | 17 | 1.35 |
| Example 19 | 22 | 20 | 17 | 1.29 |
| Example 20 | 22 | 20 | 17 | 1.29 |
| Example 21 | 22 | 20 | 17 | 1.29 |
| Example 22 | 22 | 20 | 16 | 1.37 |
| Example 23 | 22 | 20 | 16 | 1.37 |
| Example 24 | 23 | 20 | 17 | 1.35 |
| Example 25 | 22 | 20 | 17 | 1.29 |
| Com. Ex. 1 | 33 | 20 | 13 | 2.54 |
| Com. Ex. 2 | 33 | 20 | 12 | 2.75 |
| Com. Ex. 3 | 22 | 20 | 17 | 1.29 |

From the results of Tables 1 and 2, the batteries obtained in Examples 1–25 exhibited excellent steam-tightness, and their pressure to start working varied a little with variation of working temperature.

I claim:

1. A nonaqueous battery comprising a positive electrode, a negative electrode and an electrolyte in a battery can having a cap, said cap having an opening and a sealing metal plate whose circumferential portion is supported by the cap;

wherein said sealing metal plate is supported by the cap via a layer of a copolymer of an olefin and an acrylate ester or methacrylate ester which is modified with a silane compound.

2. The nonaqueous battery as defined in claim 1, wherein the copolymer has the following formula (2):

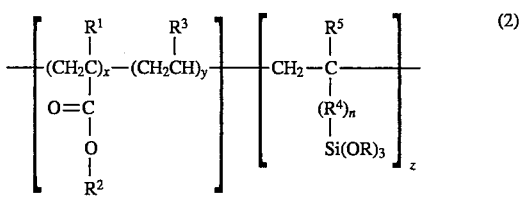

wherein $R^1$ represents hydrogen, methyl or ethyl; $R^2$ represents an alkyl group of 1 to 12 carbon atoms, an aryl group of 6 to 12 carbon atoms or an aralkyl group of 7 to 13 carbon atoms; $R^3$ represents hydrogen, methyl or ethyl; $R^4$ represents a divalent connecting group; $R^5$ is hydrogen or methyl; n is 0 or 1, OR is a group capable of being hydrolyzed; x is in the range of 5 to 40 weight %; y is in the range of 60 to 95 weight %; and z is in the 0.1 to 10 weight % based on the total weight of the copolymer.

3. The nonaqueous battery as defined in claim 2, wherein the polymer material is selected from the group consisting of ethylene-ethyl acrylate copolymer grafted with γ-methacryloxypropyltrimethoxysilane, propylene-ethyl acrylate copolymer grafted with vinyltriacetoxysilane, butylene-methyl acrylate copolymer grafted with acryloxymethyltriethoxysilane, ethylene-benzyl methacrylate copolymer grafted with vinyltriethoxysilane and ethyleneisobutyl methacrylate copolymer grafted with N-β-(N-vinylbenzylaminoethyl)-γ-aminopropylmethoxysilane.

4. The nonaqueous battery as defined in claim 1, wherein said layer of polymer material is coated over the bottom of the sealing metal plate.

5. The nonaqueous battery as defined in claim 1, wherein said layer of copolymer has a thickness of 5 to 300 μm.

6. The nonaqueous battery as defined in claim 1, wherein said sealing metal plate has a thickness of 5 to 300 μm.

7. The nonaqueous battery as defined in claim 1, wherein said sealing metal plate is made of metal selected from the group of consisting of aluminum, stainless steel, copper, and titanium.

8. The nonaqueous battery as defined in claim 1, wherein said cap has a cutter tip, wherein the distance between said tip and said sealing metal plate is 0.01 to 0.5 times the thickness of said sealing metal plate.

9. The nonaqueous battery as defined in claim 1, wherein the copolymer contains 0.1 to 10 weight % of the silane compound based on the total amount of the modified copolymer.

\* \* \* \* \*